United States Patent
Wadley et al.

(10) Patent No.: US 12,479,766 B2
(45) Date of Patent: Nov. 25, 2025

(54) FUNCTIONAL BARRIER COATING AND RELATED METHODS THEREOF

(71) Applicant: University of Virginia Patent Foundation, Charlottesville, VA (US)

(72) Inventors: Haydn N. G. Wadley, Keswick, VA (US); Jeroen A. Deijkers, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 928 days.

(21) Appl. No.: 17/271,773

(22) PCT Filed: Aug. 29, 2019

(86) PCT No.: PCT/US2019/048847
§ 371 (c)(1),
(2) Date: Feb. 26, 2021

(87) PCT Pub. No.: WO2020/047278
PCT Pub. Date: Mar. 5, 2020

(65) Prior Publication Data
US 2021/0323868 A1     Oct. 21, 2021

Related U.S. Application Data

(60) Provisional application No. 62/724,839, filed on Aug. 30, 2018.

(51) Int. Cl.
*C04B 28/00* (2006.01)
*C04B 41/00* (2006.01)
(Continued)

(52) U.S. Cl.
CPC .......... *C04B 28/006* (2013.01); *C04B 41/009* (2013.01); *C04B 41/5024* (2013.01);
(Continued)

(58) Field of Classification Search
None
See application file for complete search history.

(56) References Cited

U.S. PATENT DOCUMENTS

| | | |
|---|---|---|
| 5,985,470 A | 11/1999 | Spitsberg et al. |
| 6,607,852 B2 | 8/2003 | Spitsberg et al. |

(Continued)

FOREIGN PATENT DOCUMENTS

| | | |
|---|---|---|
| CN | 106342076 B | 7/2013 |
| CN | 109402482 A | 3/2019 |

(Continued)

OTHER PUBLICATIONS

Rost, Christina M. et al., "Entropy-Stabilized Oxides", Nature Communications, vol. 6, Sep. 29, 2015, pp. 1-8.
(Continued)

*Primary Examiner* — Jeffrey D Washville
(74) *Attorney, Agent, or Firm* — Robert J. Decker

(57) ABSTRACT

A new class of multi-component rare earth multi-silicate materials has been created for use in harsh environments such as gas turbine engines. Moreover, by combining two-or-more rare earth disilicates the properties (for example, thermal expansion, thermal conductivity, etc.) can be tailored to fit specific applications, such as having a matching thermal expansion with that of silicon-based composites and a low thermal conductivity close to that of 1 W/m K. Applications can be extended for use with other material classes such as MCrAlY, MAX-phase, and refractory metal alloys, utilizing a thermal expansion of up to about $15 \times 10^{-6}$/° C. By mixing of specific sets of rare earth disilicates it is possible to obtain a high entropy or entropy stabilized mixture, and utilize features such as "sluggish diffusion", and more.

26 Claims, 18 Drawing Sheets

(51) Int. Cl.
  *C04B 41/50* (2006.01)
  *C04B 41/52* (2006.01)
  *C04B 41/87* (2006.01)
  *C04B 41/89* (2006.01)
  *C04B 111/00* (2006.01)
  *C04B 111/20* (2006.01)
  *F01D 5/28* (2006.01)
  *H01M 8/04007* (2016.01)

(52) U.S. Cl.
  CPC ............ *C04B 41/522* (2013.01); *C04B 41/87* (2013.01); *C04B 41/89* (2013.01); *F01D 5/288* (2013.01); *H01M 8/04067* (2013.01); *C04B 2111/00482* (2013.01); *C04B 2111/2084* (2013.01); *C04B 2201/32* (2013.01); *F05D 2220/32* (2013.01); *F05D 2230/90* (2013.01); *F05D 2300/611* (2013.01)

(56) References Cited

U.S. PATENT DOCUMENTS

| | | | |
|---|---|---|---|
| 6,967,330 | B1 | 11/2005 | Lempicki et al. |
| 7,595,114 | B2 | 9/2009 | Meschter et al. |
| 7,740,960 | B1 | 6/2010 | Zhu et al. |
| 7,910,172 | B2 | 3/2011 | Meschter et al. |
| 9,640,369 | B2 | 5/2017 | Wadley et al. |
| 9,944,563 | B2 | 4/2018 | Kirby et al. |
| 10,125,618 | B2 | 11/2018 | Lee |
| 10,138,740 | B2 | 11/2018 | Kirby et al. |
| 10,214,457 | B2 | 2/2019 | Kirby et al. |
| 10,807,912 | B1 * | 10/2020 | Zhu ..................... C04B 35/481 |
| 2004/0234784 | A1 * | 11/2004 | Eaton ................... C04B 41/009 428/446 |
| 2007/0065672 | A1 | 3/2007 | Bhatia et al. |
| 2007/0111013 | A1 | 5/2007 | Bhatia et al. |
| 2013/0344319 | A1 | 12/2013 | Zhu et al. |
| 2014/0261080 | A1 | 9/2014 | Lee |
| 2014/0272197 | A1 | 9/2014 | Lee |
| 2016/0108510 | A1 | 4/2016 | Kirby et al. |
| 2016/0376691 | A1 | 12/2016 | Wadley et al. |
| 2017/0015600 | A1 | 1/2017 | Schaedler |
| 2017/0236692 | A1 | 8/2017 | Wadley et al. |
| 2017/0327937 | A1 | 11/2017 | Smyth et al. |
| 2018/0022649 | A1 * | 1/2018 | Matsumoto ........... C04B 35/653 501/103 |
| 2018/0201544 | A1 | 7/2018 | Kirby et al. |

FOREIGN PATENT DOCUMENTS

| | | |
|---|---|---|
| EP | 0493903 B1 | 12/1994 |
| EP | 3243809 B1 | 4/2019 |
| EP | 3243925 B1 | 5/2019 |
| KR | 101884442 B1 | 8/2018 |
| WO | 2010099218 A1 | 9/2010 |
| WO | 2012027442 A1 | 3/2012 |
| WO | 2015080839 A1 | 6/2015 |
| WO | 2018052739 A1 | 3/2018 |
| WO | 2018127664 A1 | 7/2018 |

OTHER PUBLICATIONS

Dong, Yu et al., "High-Entropy Environmental Barrier Coating for the Ceramic Matrix Composites", Journal of the European Ceramic Society, vol. 39, 2019 (Available Online Feb. 12, 2019), pp. 2574-2579.

Chen, Heng et al., "High Entropy (Yb0.25Y0.25Lu0.25Er0.25)2SiO5 with Strong Anistrophy in Thermal Expansion", Journal of Materials Science and Technology, vol. 36, 2020 (Available online Jul. 24, 2019), pp. 134-139.

Ren, Xiaomin et al., "Equiatomic Quarternary (Y1/4Ho1/4Er1/4Yb1/4)2SiO5 Silicate: A Perspective Multifunctional Thermal and Environmental Barrier Coating Material", Scripta Materialia, vol. 168, 2019 (Available online Apr. 24, 2019), pp. 47-50.

Tian, Zhilin et al., "Tunable Properties of (HoxY1-x) 2SiO5 as Damage Self-Monitoring Environmental/Thermal Barrier Coating Candidates", Scientific Reports, vol. 9, 2019, (Published online Jan. 23, 2019), pp. 1-7.

Luo, Yixiu et al., "Material-Genome Perspective Towards Tunable Thermal Expansion of Rare-Earth Di-Silicates", Journal of the European Ceramic Society, vol. 38, 2018 (Available online Apr. 13, 2018), pp. 3547-3554.

Vanhoutte, Michiel, "Erbium-ytterbium-yttrium compounds for light emission at 1.54um", Massachusetts Institute of Technology, Materials Science and Engineering, Feb. 2013, pp. 1-193.

Becerro, Ana I. et al., "Phase Transitions in Lu-Doped Y2Si2O7 at High Temperature", Chemistry of Materials, vol. 17, No. 1, Jan. 2005 (Published on Web Dec. 7, 2004), pp. 112-117.

Richards, Bradley T et al., "Plasma spray deposition of tri-layer environmental barrier coatings", Journal of European Ceramic Society, vol. 34, 2014 (Available online May 14, 2014, pp. 3069-3083.

WIPO, "International Search Report and Written Opinion of the International Searching Authority", International Patent Application No. PCT/US2019/048847, mailed Nov. 20, 2019, 20 pages.

* cited by examiner

MCDS-1 - Thermal conductivity reduction while retaining CTE ~ $4 \times 10^{-6}$ °C$^{-1}$

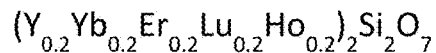
$(Y_{0.2}Yb_{0.2}Er_{0.2}Lu_{0.2}Ho_{0.2})_2Si_2O_7$

| | CTE [x10⁻⁶ /°C] | κ [W/m K] | Density [%] | RE1 | RE2 | RE3 | RE4 | RE5 | RE6 |
|---|---|---|---|---|---|---|---|---|---|
| MCDS-1 | 4.35 | 2.20 | 91.6 | Y | Yb | Er | Lu | Ho | - |
| MCDS-2 | 7.05 | 1.13 | 86.4 | Y | Yb | Er | La | Sm | - |
| MCDS-3 | 6.58 | 1.57 | 92.7 | Y | Yb | Er | Lu | La | - |
| MCDS-4 | 6.54 | 1.80 | 97.3 | Y | Yb | Er | Lu | Ho | La |
| MCDS-5 | 5.64 | 1.78 | 52.3 | Y | Yb | Er | Lu | Ho | Gd |

FIG. 6A

MCDS-1 - Thermal conductivity reduction while retaining CTE ~ $4 \times 10^{-6}$ °C$^{-1}$ Cold-pressed oxides at 40 MPa, anneal at 1500°C for 72 hours

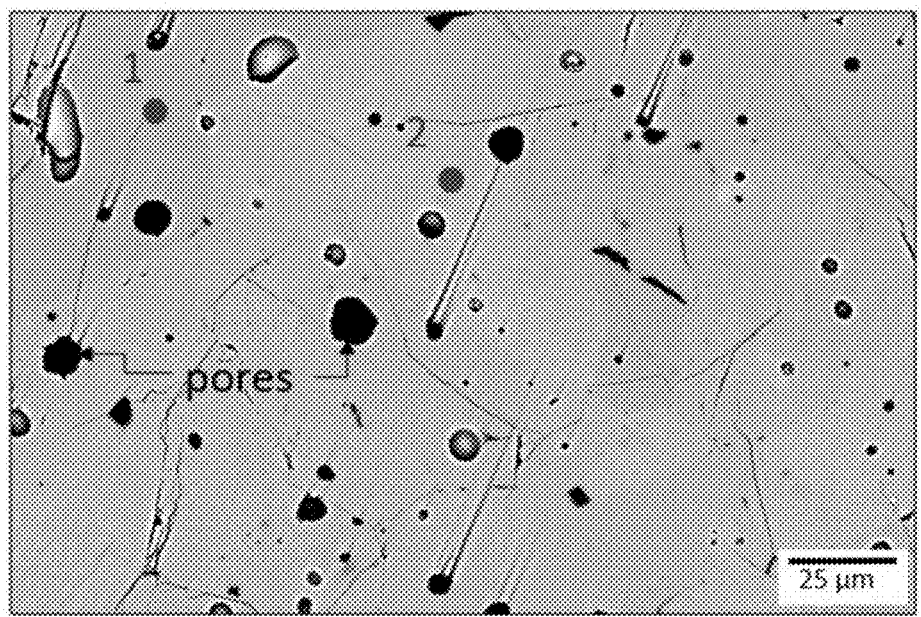

| Place | Si | Y | Yb | Er | Lu | Ho | |
|---|---|---|---|---|---|---|---|
| 1 | 33.1 | 14.3 | 13.1 | 13.2 | 13.1 | 13.2 | β-polymorph |
| 2 | 33.6 | 13.6 | 13.5 | 13.3 | 12.8 | 13.3 | β-polymorph |

FIG. 6B

MCDS-2 – Effect of multi-phase RE-DS on CTE and thermal conductivity $(Y_{0.2}Yb_{0.2}Er_{0.2}La_{0.2}Sm_{0.2})_2Si_2O_7$

| | CTE [x$10^{-6}$/°C] | $\kappa$ [W/m K] | Density [%] | RE1 | RE2 | RE3 | RE4 | RE5 | RE6 |
|---|---|---|---|---|---|---|---|---|---|
| MCDS-1 | 4.35 | 2.20 | 91.6 | Y | Yb | Er | Lu | Ho | - |
| MCDS-2 | 7.05 | 1.13 | 86.4 | Y | Yb | Er | La | Sm | - |
| MCDS-3 | 6.58 | 1.57 | 92.7 | Y | Yb | Er | Lu | La | - |
| MCDS-4 | 6.54 | 1.80 | 97.3 | Y | Yb | Er | Lu | Ho | La |
| MCDS-5 | 5.64 | 1.78 | 52.3 | Y | Yb | Er | Lu | Ho | Gd |

FIG. 7A

MCDS-2 – Effect of multi-phase RE-DS on CTE and thermal conductivity

Cold-pressed oxides at 40 MPa, annealed at 1500°C for 72 hours

| Phase | Si | Y | Yb | Er | Sm | La | |
|---|---|---|---|---|---|---|---|
| 1 | 32.1 | 18.6 | 9.7 | 10.1 | 12.5 | 17.0 | α-polymorph |
| 2 | 29.7 | 23.3 | 14.6 | 13.6 | 11.7 | 7.1 | β-polymorph |

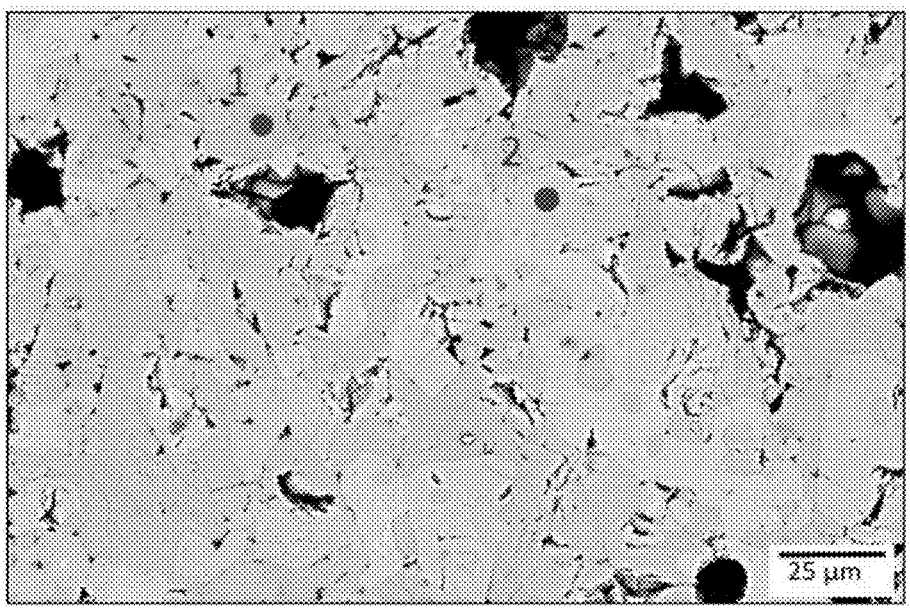

FIG. 7B

MCDS-3 – Effect of multi-phase RE-DS on CTE and thermal conductivity $(Y_{0.2}Yb_{0.2}Er_{0.2}Lu_{0.2}La_{0.2})_2Si_2O_7$

| | CTE [x10⁻⁶ /°C] | κ [W/m K] | Density [%] | RE1 | RE2 | RE3 | RE4 | RE5 | RE6 |
|---|---|---|---|---|---|---|---|---|---|
| MCDS-1 | 4.35 | 2.20 | 91.6 | Y | Yb | Er | Lu | Ho | - |
| MCDS-2 | 7.05 | 1.13 | 86.4 | Y | Yb | Er | La | Sm | - |
| MCDS-3 | 6.58 | 1.57 | 92.7 | Y | Yb | Er | Lu | La | - |
| MCDS-4 | 6.54 | 1.80 | 97.3 | Y | Yb | Er | Lu | Ho | La |
| MCDS-5 | 5.64 | 1.78 | 52.3 | Y | Yb | Er | Lu | Ho | Gd |

FIG. 8A

MCDS-3 – Effect of multi-phase RE-DS on CTE and thermal conductivity

Cold-pressed oxides at 40 MPa, annealed at 1500°C for 72 hours

| Phase | Si | Y | Yb | Er | Lu | La | |
|---|---|---|---|---|---|---|---|
| 1 | 34.9 | 9.6 | 6.7 | 8.1 | 5.4 | 35.3 | G-polymorph |
| 2 | 35.2 | 14.2 | 16.2 | 15.9 | 15.7 | 2.8 | β-polymorph |

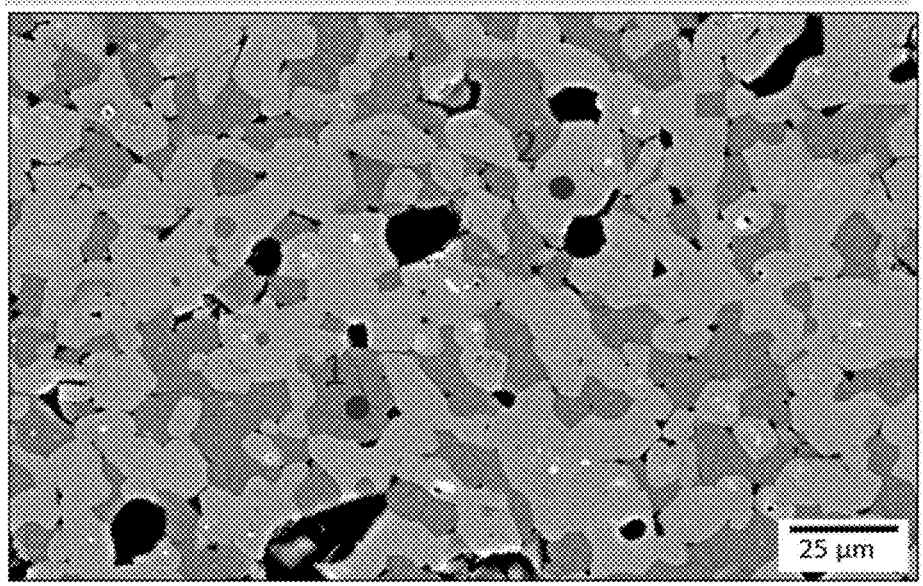

FIG. 8B

MCDS-4 – Addition of large radius cation RE to MCDS-1 mixture $(Y_{0.166}Yb_{0.166}Er_{0.166}Lu_{0.166}Ho_{0.166}La_{0.166})_2Si_2O_7$

| | CTE [×10⁻⁶ /°C] | κ [W/m K] | Density [%] | RE1 | RE2 | RE3 | RE4 | RE5 | RE6 |
|---|---|---|---|---|---|---|---|---|---|
| MCDS-1 | 4.35 | 2.20 | 91.6 | Y | Yb | Er | Lu | Ho | - |
| MCDS-2 | 7.05 | 1.13 | 86.4 | Y | Yb | Er | La | Sm | - |
| MCDS-3 | 6.58 | 1.57 | 92.7 | Y | Yb | Er | Lu | La | - |
| MCDS-4 | 6.54 | 1.80 | 97.3 | Y | Yb | Er | Lu | Ho | La |
| MCDS-5 | 5.64 | 1.78 | 52.3 | Y | Yb | Er | Lu | Ho | Gd |

MCDS-4 – Addition of large radius cation RE to MCDS-1 mixture
Cold-pressed oxides at 40 MPa, annealed at 1500°C for 72 hours

| | Si | Y | Yb | Er | Ho | Lu | La | |
|---|---|---|---|---|---|---|---|---|
| 1 | 26.3 | 19.9 | 5.8 | 7.2 | 5.5 | 8.5 | 26.8 | γ-polymorph |
| 2 | 26.4 | 22.9 | 13.2 | 11.4 | 13.7 | 10.8 | 1.6 | β-polymorph |

MCDS-5 – Addition of medium radius cation RE to MCDS-1 mixture

$(Y_{0.166}Yb_{0.166}Er_{0.166}Lu_{0.166}Ho_{0.166}Gd_{0.166})_2Si_2O_7$

| | CTE [x10⁻⁶/°C] | κ [W/m K] | Density [%] | RE1 | RE2 | RE3 | RE4 | RE5 | RE6 |
|---|---|---|---|---|---|---|---|---|---|
| MCDS-1 | 4.35 | 2.20 | 91.6 | Y | Yb | Er | Lu | Ho | - |
| MCDS-2 | 7.05 | 1.13 | 86.4 | Y | Yb | Er | La | Sm | - |
| MCDS-3 | 6.58 | 1.57 | 92.7 | Y | Yb | Er | Lu | La | - |
| MCDS-4 | 6.54 | 1.80 | 97.3 | Y | Yb | Er | Lu | Ho | La |
| MCDS-5 | 5.64 | 1.78 | 52.3 | Y | Yb | Er | Lu | Ho | Gd |

MCDS-5 – Addition of medium radius cation RE to MCDS-1 mixture

Cold-pressed oxides at 40 MPa, annealed at 1500°C for 72 hours

| Phase | Si | Y | Yb | Er | Lu | Ho | Gd | |
|---|---|---|---|---|---|---|---|---|
| 1 | 52.4 | 8.3 | 7.7 | 7.9 | 7.7 | 7.8 | 8.2 | γ-polymorph |
| 2 | 52.3 | 8.3 | 7.8 | 7.5 | 8.1 | 7.6 | 8.4 | γ-polymorph |

FUNCTIONAL BARRIER COATING AND RELATED METHODS THEREOF

RELATED APPLICATIONS

The present application is a national stage filing of International Application No. PCT/US2019/048847, filed Aug. 29, 2019, which claims benefit of priority under 35 U.S.C § 119 (e) from U.S. Provisional Application Ser. No. 62/724,839, filed Aug. 30, 2018, entitled "High Entropy (Entropy Stabilized) Rare Earth Disilicates: A New Class of Tunable Ceramic Materials with Utility for Environmental Protection of High Temperature Composites"; the disclosures of which are hereby incorporated by reference herein in their entirety.

STATEMENT OF GOVERNMENT INTEREST

This invention was made with government support under Grant No. N00014-15-1-2756 awarded by the Office of Navel Research. The government has certain rights in the invention.

FIELD OF INVENTION

This invention relates to coating systems suitable for protecting components exposed to high-temperature environments, such as the hostile thermal environment of a gas turbine engine. More particularly, this invention is directed to a functional barrier coating system for a substrate formed of a silicon based material or other alternative material.

BACKGROUND

Environmental barrier coatings (EBCs) are needed to protect SiC-based ceramic components in future gas turbines. Their primary purpose is to eliminate the rapid volatilization of SiC in water vapor rich environments, while also inhibiting oxidation of SiC-based ceramic matrix composites (CMCs). The design of these EBCs is therefore driven by a different combination of objectives to those of thermal barrier coating (TBC) systems used to extend the life of superalloy airfoils. The objective of TBC designs is to reduce a metal component's surface temperature while delaying delamination failure from oxidation, molten deposits, and various forms of hot corrosion. However, unlike TBC systems where coating spallation results in damage but usually not loss of the airfoil, the premature failure of an EBC could have consequences that are much more serious, since the life of an unprotected SiC component in a combustion environment is likely to be short. The development of durable EBC systems when used in thermo-cyclic, water vapor rich environments is therefore of considerable importance to the implementation of SiC-based CMCs.

For applications up to 1316° C. (2400° F.), research has focused on multilayered EBC systems that use a Si "bond coat" applied to the SiC. The design objective for the bond coat is similar to that of the aluminum-rich metallic layer used in TBC systems. It serves as a sacrificial layer that forms a protective thermally grown oxide ($SiO_2$) upon exposure to oxidizing species, thereby inhibiting their access to the SiC-based component surface. However, volatilization of the protective oxide occurs by its reaction with water vapor molecules to form gaseous $Si(OH)_4$. The bond coat is therefore covered by materials that are intended to impede the diffusion of oxygen and water vapor to the Si surface, while being highly resistant to vapor forming reactions with water (steam volatilization).

These design objectives must be achieved subject to numerous constraints. For example, the various layers must have a coefficient of thermal expansion (CTE) similar to SiC to avoid cracking or delamination during heating and cooling over the wide temperature range experienced during operation of a gas turbine engine. The EBC materials must stable and also thermochemically compatible so that deleterious reaction products are not formed between them. In addition, they must meet other demands of the engine environment which include resistance to erosion by fine (dust) particles, —larger foreign object damage (FOD)— and reactions with molten calcium-magnesium-aluminum-silicates (CMAS). Finally, when used on rotated components, EBCs will be required to sustain significant static and cyclic loads that can cause creep deformation and fracture. This environment is therefore one of the most severe ever envisioned for an advanced material system.

The ytterbium monosilicate ($Yb_2SiO_5$)/mullite ($Al_6Si_2O_{13}$)/Si tri-layer system has received significant recent attention due to the thermochemical compatibility between its component materials and the very low steam volatility of $Yb_2SiO_5$ (YbMS). However, the CTE of YbMS has been found to be substantially higher than that of SiC ($7.5 \times 10^{-6}$ C.-1 for YbMS versus $4.7 \times 10^{-6}$ C.-1 for SiC). This results in the development of a high (biaxial) tension and significant stored elastic strain energy in the YbMS layer during cooling, and is relieved by channel (mud) cracking. The presence of cracks through the YbMS and mullite (which also has a higher CTE than that of SiC) layers then provides oxidizing species a gas phase transport path to the Si bond coat, resulting in the rapid growth of a β-cristobalite ($SiO_2$) phase on the outer silicon surface. The thermally grown oxide (TGO) undergoes a large reduction in volume (~4.5%) during its cubic to tetragonal (inversion type) β→α phase transformation upon cooling through ~220° C., resulting in severe TGO microcracking, loss of its oxidation protection qualities, and the premature spallation of the EBC. These observations indicate that high CTE topcoat candidates (including YbMS, other rare earth silicates with high CTE, and aluminum-silicates such as mullite), are unsuitable materials for the diffusion-impeding layers of EBC systems.

Ytterbium disilicate (YbDS), a line compound in the $Yb_2O_3$—$SiO_2$ binary phase diagram with composition $Yb_2Si_2O_7$, is a promising alternate material for environmental barrier layer applications since it has a CTE of $4.1 \times 10^{-6}$ C.$^{-1}$ (compared to $4.7 \times 10^{-6}$ C.$^{-1}$ for SiC). YbDS therefore satisfies one of the primary design constraints of an EBC application. However, its resistance to volatilization by reactions with water vapor is significantly less than that of its monosilicate counterpart. Its oxygen diffusivity at the relevant temperatures has also been characterized and it is thermochemical stable in contact with Si. Si—YbDS is therefore the current state of the art EBC system.

Therefore, there is a long felt need for a barrier coating system to provide a coating and related components that resist cracking or shattering while exhibiting an extended lifespan and improved reliability.

SUMMARY OF ASPECTS OF EMBODIMENTS OF THE INVENTION

An aspect of an embodiment provides, but not limited thereto, a new class of multi-component rare earth multi-silicate materials that has been created by the present inventor and that which may be used for, but not limited thereto, applications in harsh environments such as gas turbine engines. The present inventor determined that by combining two-or-more rare earth disilicates the properties (for example, thermal expansion, thermal conductivity, etc.) can be tailored to fit specific applications, such as having a matching thermal expansion with that of silicon-based composites and a low thermal conductivity close to that of 1 W/m K. Applications can be extended for use with other material classes such as MCrAlY, MAX-phase, and refractory metal alloys, utilizing a thermal expansion of up to about $15 \times 10^{-6}$/° C. By mixing of specific sets of rare earth disilicates it is possible to obtain a high entropy or entropy stabilized mixture, and utilize features such as "sluggish diffusion", and more.

An aspect of an embodiment provides, among other things, a multi-component rare earth multi-silicate comprising a composition represented by the following formula:

$$(X_{a1}{}^1 X_{a2}{}^2 \ldots X_{an}{}^n)_u O_z\text{-}m\text{SiO}_2;$$

wherein:
  $a_1$, $a_2$, through $a_n$ can be equal to any number between 0 and 1, wherein the sum of $a_1 + a_2 + \ldots + a_n$ is equal to 1;
  n is at least 2;
  u is 1 or 2;
  z is 2 or 3;
  m is greater than 1; and
  $X^1$, $X^2$, through $X^n$ are selected from Sc, Y, La, Ce, Pr, Nd, Pm, Sm, Eu, Gd, Tb, Dy, Ho, Er, Tm, Yb, Lu, Hf, Zr, and Ti; and
wherein the multi-component rare earth multi-silicate is characterized by at least one thermophysical or thermochemical property.

An aspect of an embodiment provides, among other things, a barrier coating for application to a substrate material. The barrier coating may comprise:
  a) a bond coat and a functional barrier, or
  b) a functional barrier; and
wherein the functional barrier comprises:
  a multi-component rare earth multi-silicate comprising a composition represented by the following formula:

$$(X_{a1}{}^1 X_{a2}{}^2 \ldots X_{an}{}^n)_z O_z\text{-}m\text{SiO}_2;$$

wherein:
  $a_1$, $a_2$, through $a_n$ can be equal to any number between 0 and 1, wherein the sum of $a_1 + a_2 + \ldots + a_n$ is equal to 1;
  n is at least 2;
  u is 1 or 2;
  z is 2 or 3;
  m is greater than 1; and
  $X^1$, $X^2$, through $X^n$ are selected from Sc, Y, La, Ce, Pr, Nd, Pm, Sm, Eu, Gd, Tb, Dy, Ho, Er, Tm, Yb, Lu, Hf, Zr, and Ti; and
wherein the multi-component rare earth multi-silicate is characterized by at least one thermophysical or thermochemical property.

An aspect of an embodiment provides, among other things, a method for applying a barrier coating to a substrate material. The method may method comprise:
  a) applying a bond coat and a functional barrier, or
  b) applying a functional barrier; and
wherein the functional barrier comprises:
  a multi-component rare earth multi-silicate comprising a composition represented by the following formula:

$$(X_{a1}{}^1 X_{a2}{}^2 \ldots X_{an}{}^n)_u O_z\text{-}m\text{SiO}_2;$$

wherein:
  $a_1$, $a_2$, through $a_n$ can be equal to any number between 0 and 1, wherein the sum of $a_1 + a_2 + \ldots + a_n$ is equal to 1;
  n is at least 2;
  u is 1 or 2;
  z is 2 or 3;
  m is greater than 1; and
  $X^1$, $X^2$, through $X^n$ are selected from Sc, Y, La, Ce, Pr, Nd, Pm, Sm, Eu, Gd, Tb, Dy, Ho, Er, Tm, Yb, Lu, Hf, Zr, and Ti; and
wherein the multi-component rare earth multi-silicate is characterized by at least one thermophysical or thermochemical property.

An aspect of an embodiment provides, among other things, a silicon based ceramic compound comprising a barrier coating. The barrier coating may comprise:
  a) a bond coat and a functional barrier, or
  b) a functional barrier; and
wherein the functional barrier comprises:
  a multi-component rare earth multi-silicate comprising a composition represented by the following formula:

$$(X_{a1}{}^1 X_{a2}{}^2 \ldots X_{an}{}^n)_u O_z\text{-}m\text{SiO}_2;$$

wherein:
  $a_1$, $a_2$, through $a_n$ can be equal to any number between 0 and 1, wherein the sum of $a_1 + a_2 + \ldots + a_n$ is equal to 1;
  n is at least 2;
  u is 1 or 2;
  z is 2 or 3;
  m is greater than 1; and
  $X^1$, $X^2$, through $X^n$ are selected from Sc, Y, La, Ce, Pr, Nd, Pm, Sm, Eu, Gd, Tb, Dy, Ho, Er, Tm, Yb, Lu, Hf, Zr, and Ti; and
wherein the multi-component rare earth multi-silicate is characterized by at least one thermophysical or thermochemical property.

An aspect of an embodiment of the present invention provides, among other things, a new state of matter that may comprise of approximately equal molar concentrations of 2, 3, 4, 5 or more rare earth oxides that are reacted with twice the molar fraction of silica to form a multi-component rare earth disilicate.

By selecting the rare earth oxide mix, and their relative molar fractions, entropy stabilized rare earth disilicates can be synthesized with ultra-low thermal conductivity making them ideal candidates for, among other things, high temperature thermal management applications.

By tuning (or adjusting as specified) the composition the thermal conductivity and other thermo-physical and thermo-chemical properties of the multi-component rare earth disilicates can be tuned (or adjusted as specified) for their use in various applications. An aspect of various embodiments of the present invention may be utilized for a number of applications, products and services, such as but not limited thereto, the following: thermal and environmental barrier coatings, hypersonic leading edges, fuel cells, impact protective barrier layer, thermal shock protective layer, and various optical applications in which tuning (or adjusting as specified) of refractive index and optical absorption are of interest.

The multi-component rare earth disilicates resist sintering implying that they exhibit "sluggish" diffusion. This characteristic may have important consequences for uses of, but not limited thereto, the materials as high temperature atomic/molecular diffusion barriers and in situations where the reduction of creep straining is important.

An aspect of an embodiment of the present invention provides, among other things, a simple method for the synthesis of the material from its rare earth oxides and silica powders is described.

An aspect of an embodiment of the present invention provides for, among other things, high entropy, or entropy stabilization, that can be used to design a new class of mixed rare earth disilicates (MRES) in which 2, 3, 4, 5 or more approximately equimolar concentrations of rare earth oxides are reacted with silica to form entropy stabilized disilicate compounds with, for example, the general formula [RE1+ RE2+ ... ReN]$_2$O$_3$·2SiO$_2$—where RE1 is rare earth element type 1, etc.

It should be appreciated that any of the components or modules referred to with regards to any of the present invention embodiments discussed herein, may be integrally or separately formed with one another. Further, redundant functions or structures of the components or modules may be implemented. Moreover, various components and modules may be substituted with other modules or components that provide similar functions.

It should be appreciated that the device and related components discussed herein may take on all shapes along the entire continual geometric spectrum of manipulation of x, y and z planes to provide and meet the anatomical, environmental, and structural demands and operational requirements. Moreover, locations and alignments of the various components may vary as desired or required.

It should be appreciated that various sizes, dimensions, contours, rigidity, shapes, flexibility and materials of any of the components or portions of components in the various embodiments discussed throughout may be varied and utilized as desired or required.

It should be appreciated that while some dimensions are provided on the aforementioned figures, the device may constitute various sizes, dimensions, contours, rigidity, shapes, flexibility and materials as it pertains to the components or portions of components of the device, and therefore may be varied and utilized as desired or required.

Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the n$^{th}$ reference in the list. All references cited and discussed in this specification are incorporated herein by reference in their entireties and to the same extent as if each reference was individually incorporated by reference.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g. 1 to 5 includes 1, 1.5, 2, 2.75, 3, 3.90, 4, 4.24, and 5). Similarly, numerical ranges recited herein by endpoints include subranges subsumed within that range (e.g. 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The invention itself, together with further objects and attendant advantages, will best be understood by reference to the following detailed description, taken in conjunction with the accompanying drawings.

These and other objects, along with advantages and features of various aspects of embodiments of the invention disclosed herein, will be made more apparent from the description, drawings and claims that follow.

BRIEF DESCRIPTION OF THE DRAWINGS

The foregoing and other objects, features and advantages of the present invention, as well as the invention itself, will be more fully understood from the following description of preferred embodiments, when read together with the accompanying drawings.

The accompanying drawings, which are incorporated into and form a part of the instant specification, illustrate several aspects and embodiments of the present invention and, together with the description herein, serve to explain the principles of the invention. The drawings are provided only for the purpose of illustrating select embodiments of the invention and are not to be construed as limiting the invention.

FIGS. 6(A)-(D) are screenshots of the experimental results for a multi-component disilicate (MCDS), sample no. 1, examining the effect of mixing small radius rare-earth cation disilicates on thermal conductivity reduction while retaining a coefficient of thermal expansion (CTE) of about $4 \times 10^{-6 \circ} C.^{-1}$, using five (5) rare-earth disilicates (RE-DS) in an equi-molar ratio.

FIGS. 7(A)-(D) are screenshots of the experimental results for a multi-component disilicate (MCDS), sample no. 2, examining the effect of mixing multi-phase rare earth disilicates (RE-DS) on coefficient of thermal expansion (CTE) and thermal conductivity, using five (5) rare-earth disilicates (RE-DS) in an equi-molar ratio.

FIG. 8(A)-(D) are screenshots of the experimental results for a multi-component disilicate (MCDS), sample no. 3, further examining the effect of mixing various multi-phase rare earth disilicates (RE-DS) on coefficient of thermal expansion (CTE) and thermal conductivity, using five (5) rare-earth disilicates (RE-DS) in an equi-molar ratio.

DETAILED DESCRIPTION OF ASPECTS OF EXEMPLARY EMBODIMENTS

Figure 1:
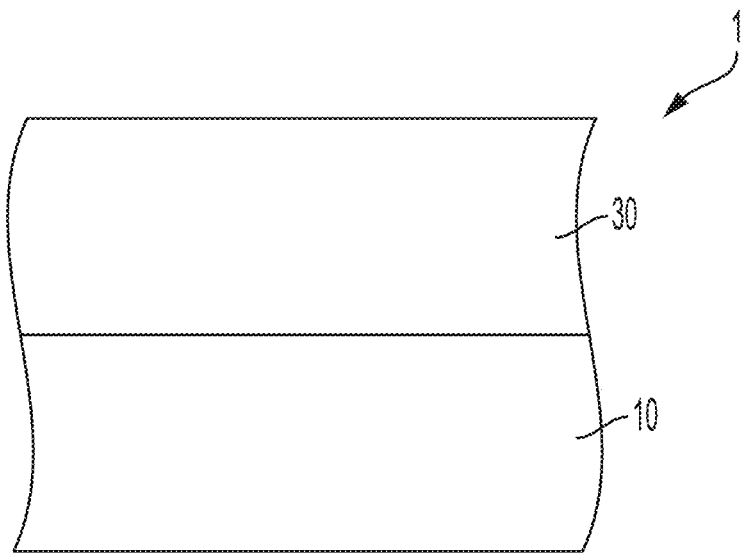
FIG. 1 schematically illustrates a partial cross-sectional view of an embodiment of a barrier coating.

FIG. 1 schematically illustrates a partial cross-sectional view of an embodiment of a barrier coating 1 comprised of a substrate material 10 and functional barrier 30. In an embodiment, the substrate material 10 may be, but not limited thereto, any one or more of the following: silicon-based ceramic composite, silicon-based ceramic compound, MAX-phase, MCrAlY, refractory metal alloy (e.g., high-entropy), and nickel and/or cobalt-based superalloy.

Figure 2:
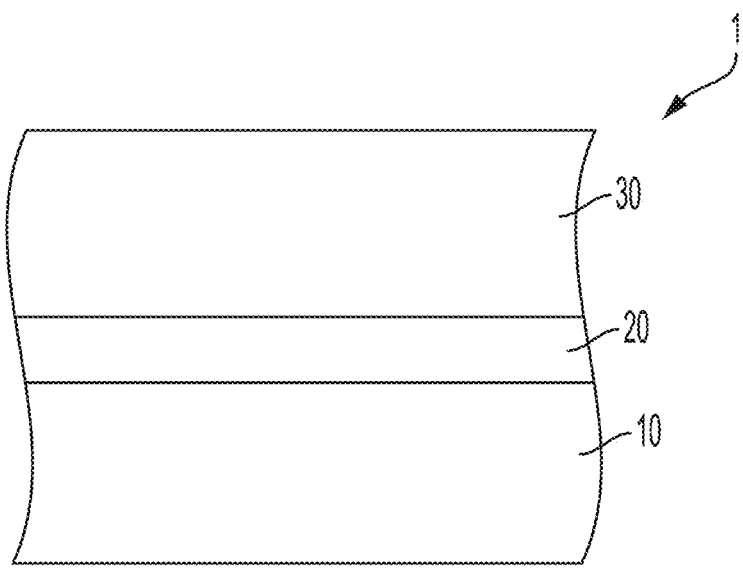
FIG. 2 schematically illustrates a partial cross-sectional view of an embodiment of a barrier coating.

FIG. 2 schematically illustrates a partial cross-sectional view of an embodiment of a barrier coating 1 comprised of a substrate material 10, bond coat 20, and functional barrier 30. In an embodiment, the substrate material 10 may be, but not limited thereto, any one or more of the following: silicon-based ceramic composite, silicon-based ceramic compound, MAX-phase, refractory metal alloy (e.g., high-entropy), and nickel and/or cobalt-based superalloy. In an embodiment, the bond coat 20 may be, but not limited thereto, any one or more of the following: silicon, silicon-based ceramic compound, MAX-phase, MCrAlY, and refractory metal alloy (e.g., high-entropy).

Figure 3:
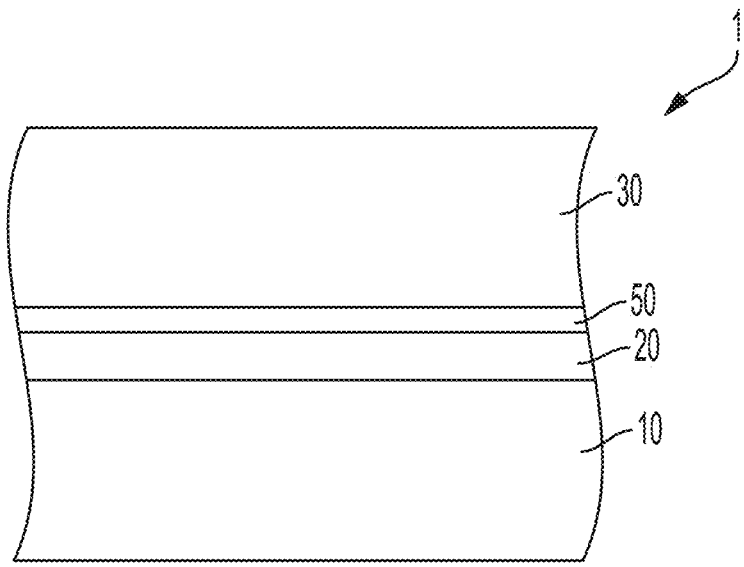
FIG. 3 schematically illustrates a partial cross-sectional view of an embodiment of a barrier coating.

FIG. 3 schematically illustrates a partial cross-sectional view of an embodiment of a barrier coating 1 similar to FIG. 2 and further comprises and intermediate coating or layer 50.

Figure 4:
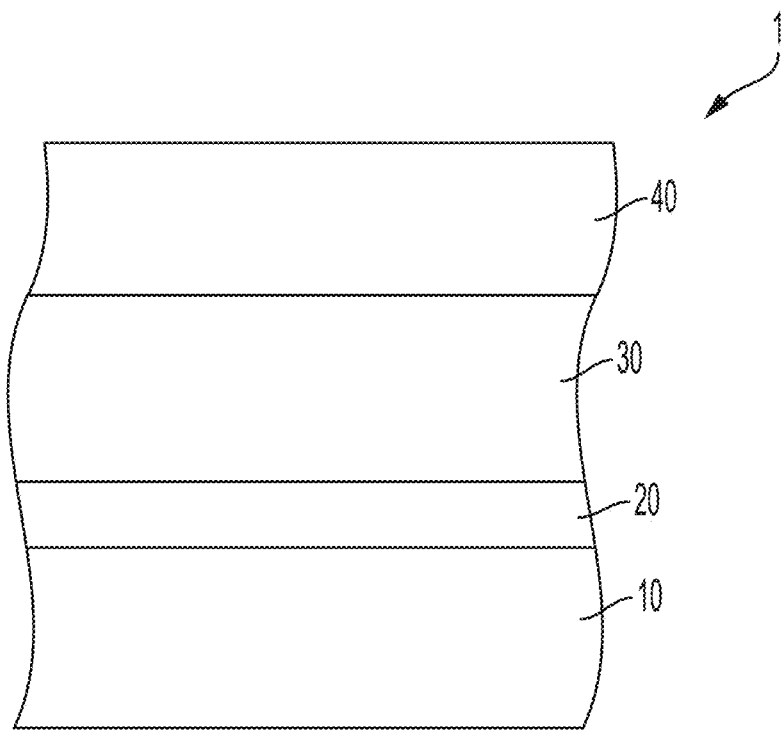
FIG. 4 schematically illustrates a partial cross-sectional view of an embodiment of a barrier coating.

FIG. 4 schematically illustrates a partial cross-sectional view of an embodiment of a barrier coating 1 comprised of a substrate material 10, bond coat 20, functional barrier 30, and top coat or layer 40. In an embodiment, the substrate material 10 may be, but not limited thereto, any one or more of the following: silicon-based ceramic composite, silicon-based ceramic compound, MAX-phase, refractory metal alloy (e.g., high-entropy), and nickel and/or cobalt-based superalloy. In an embodiment, the bond coat 20 may be, but not limited thereto, any one or more of the following: silicon, silicon-based ceramic compound, MAX-phase, MCrAlY, and refractory metal alloy (e.g., high-entropy).

Figure 5:
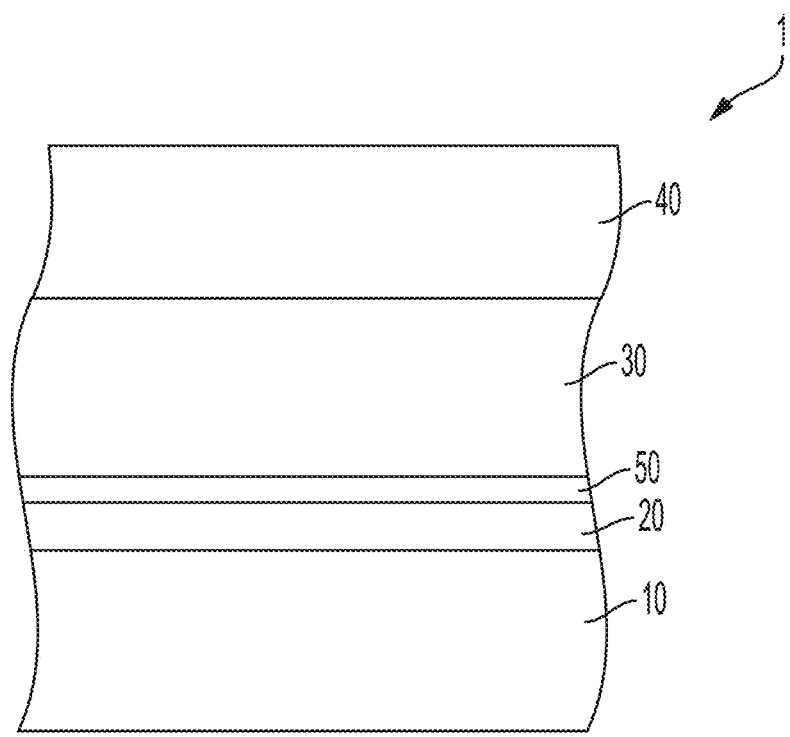
FIG. 5 schematically illustrates a partial cross-sectional view of an embodiment of a barrier coating.
Figure 6C:
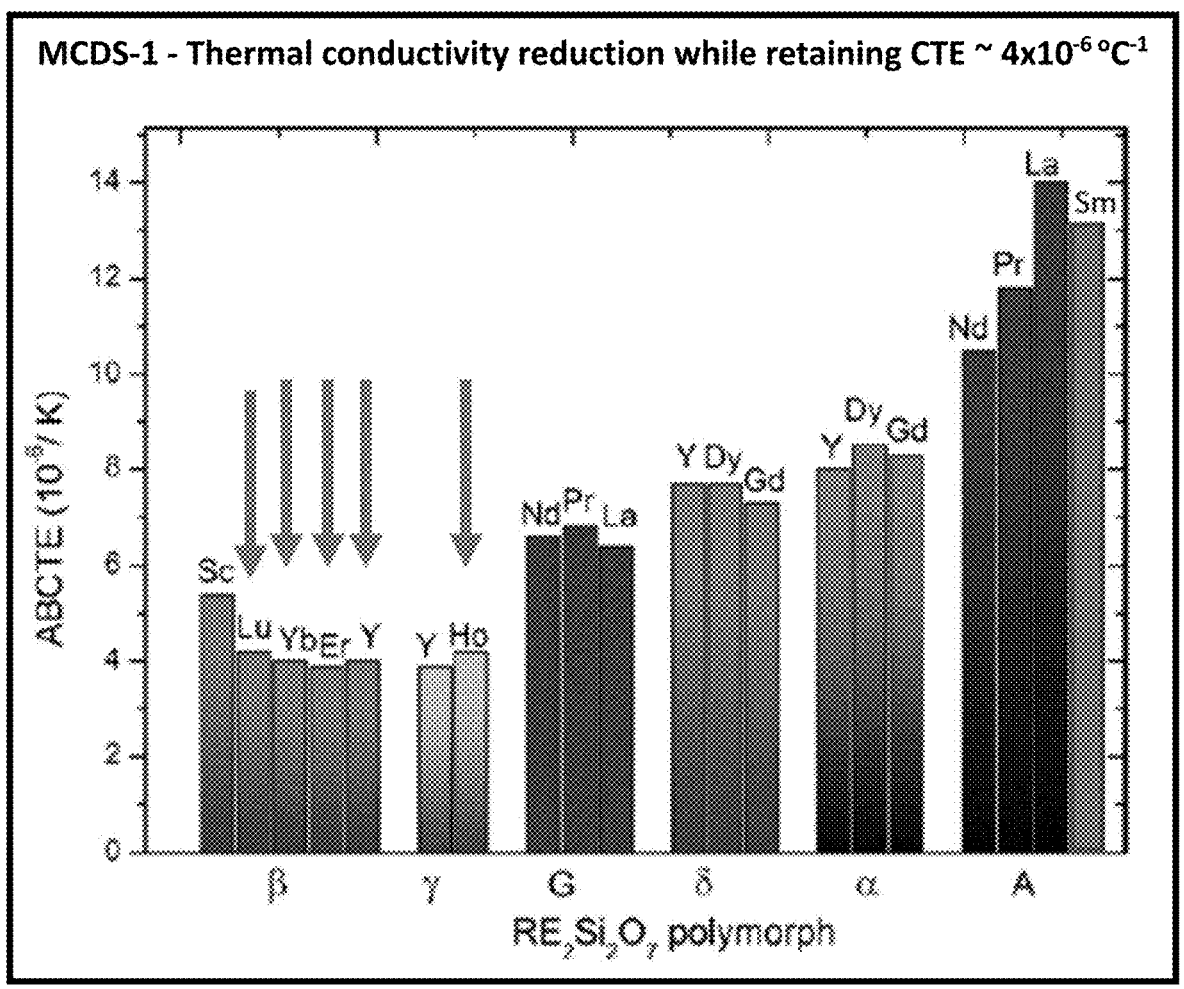
Figure 6D:
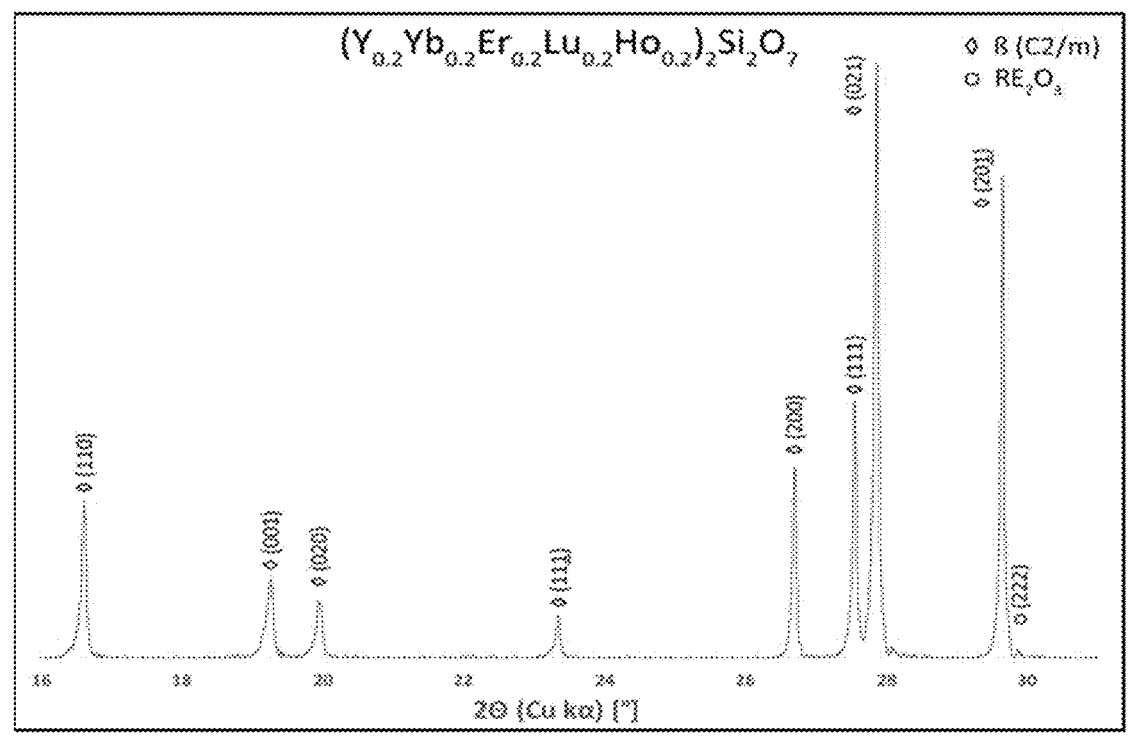
Figure 7C:
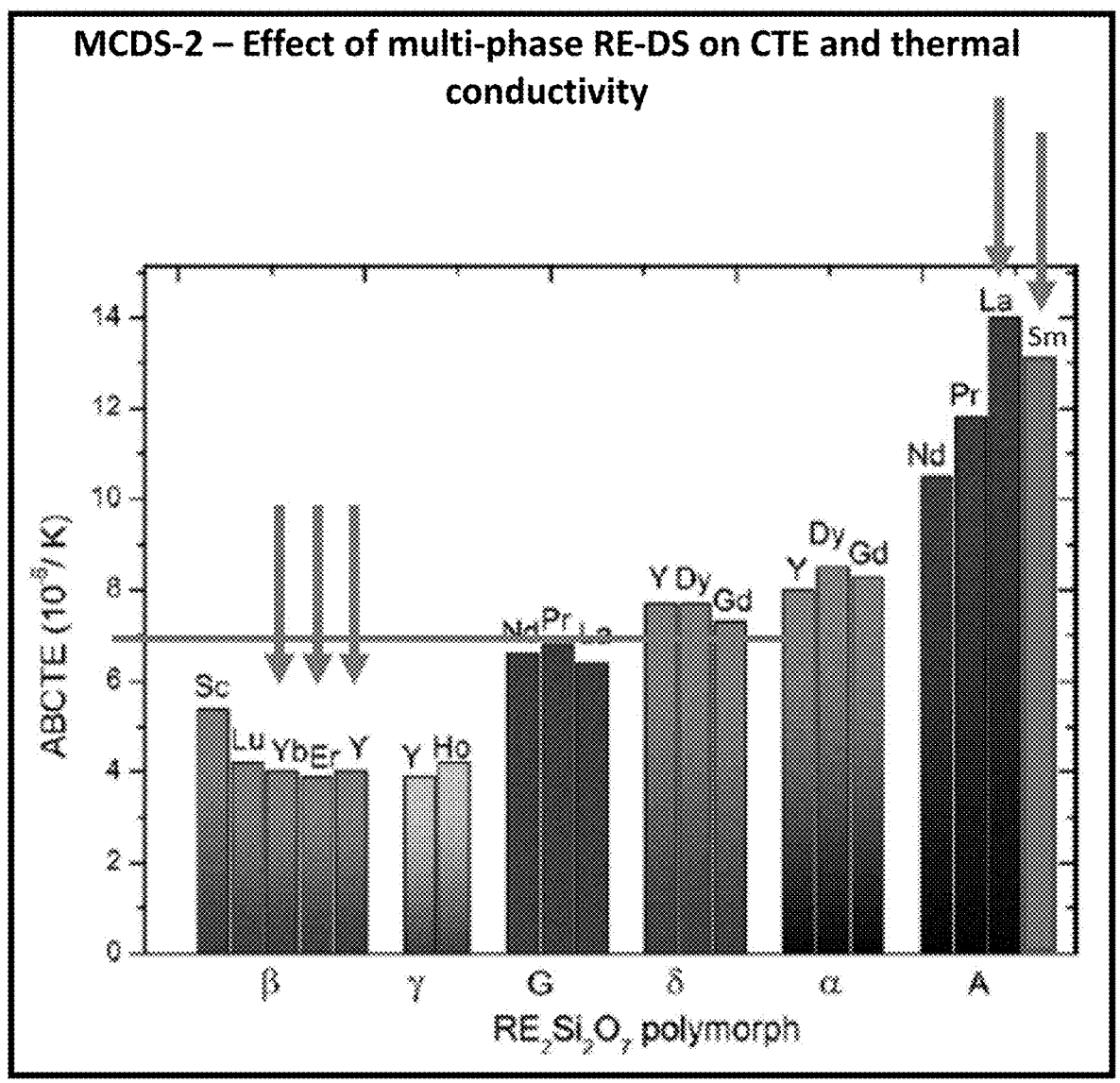
Figure 7D:
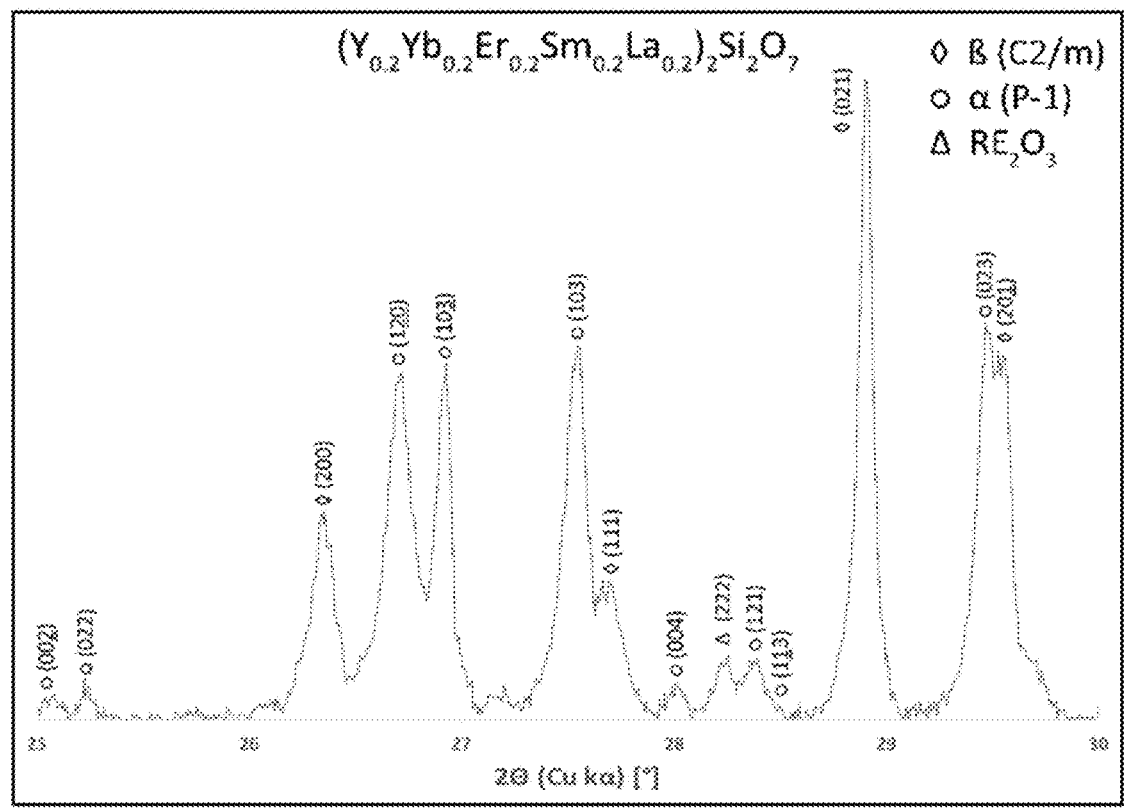
Figure 8C:
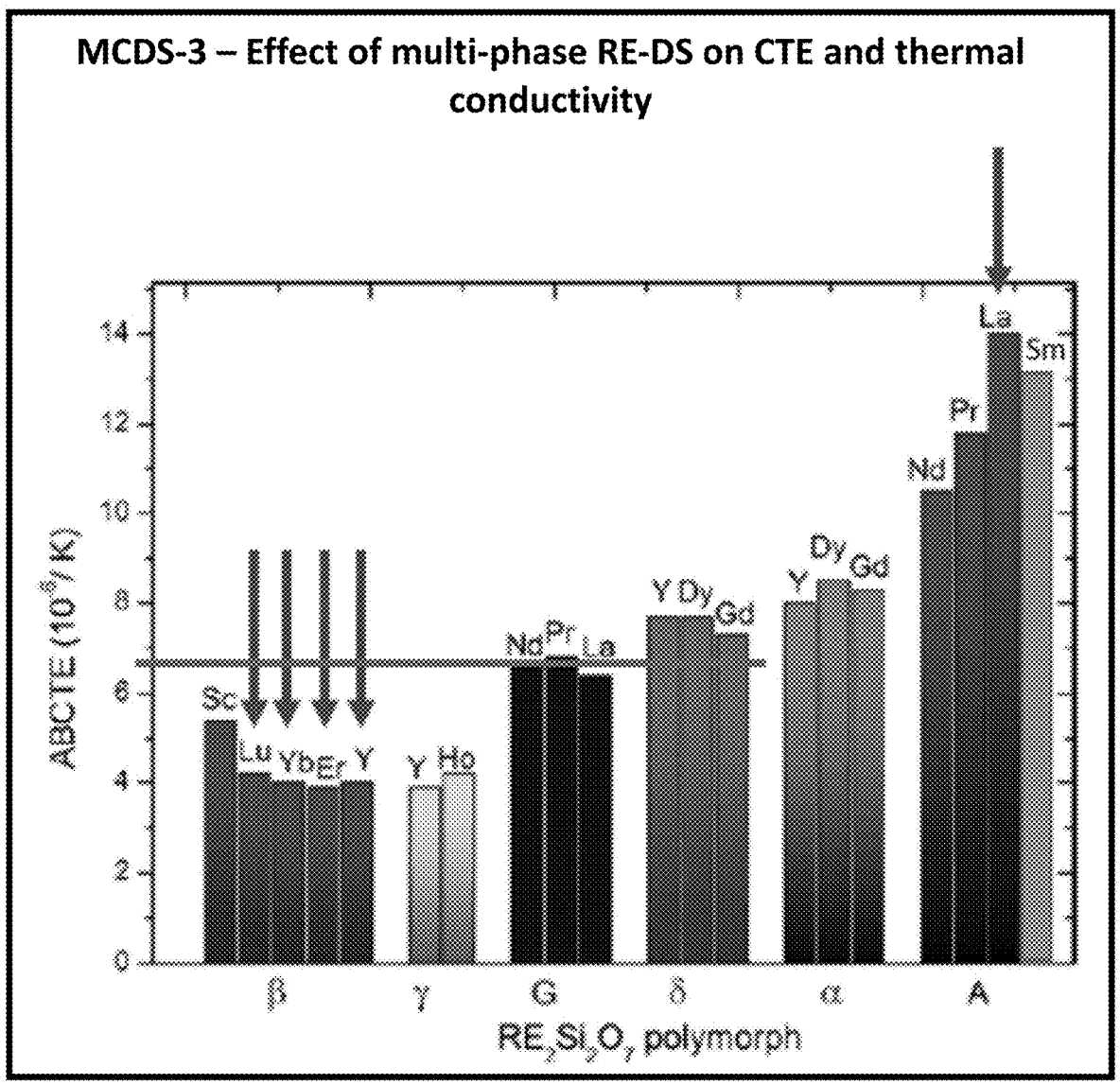
Figure 8D:
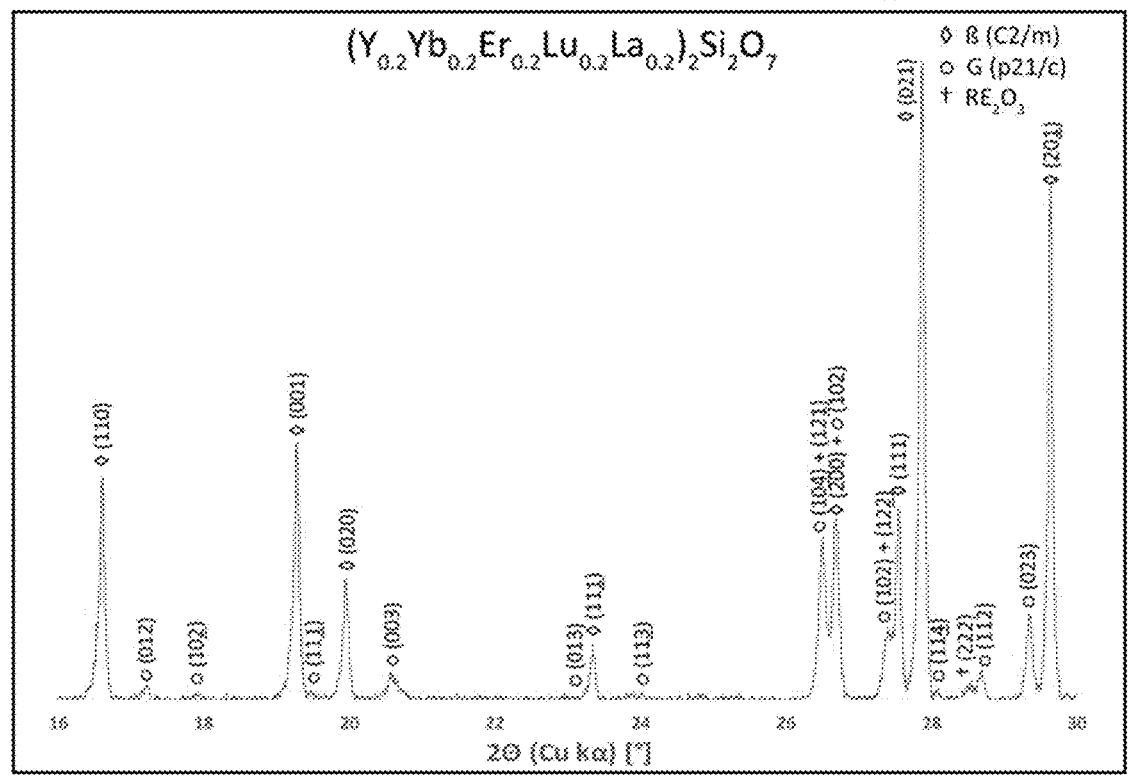
Figures 9A, 9B:
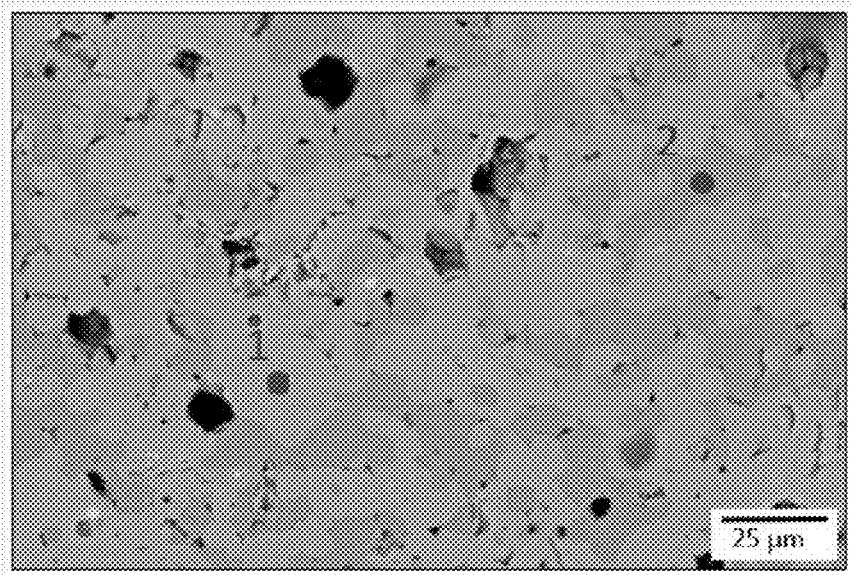
FIG. 9(A)-(D) are screenshots of the experimental results for a multi-component disilicate (MCDS), sample no. 4, examining the addition of a large radius rare-earth cation to the MCDS-1 mixture, using six (6) rare-earth disilicates (RE-DS) in an equi-molar ratio.
Figure 9C:
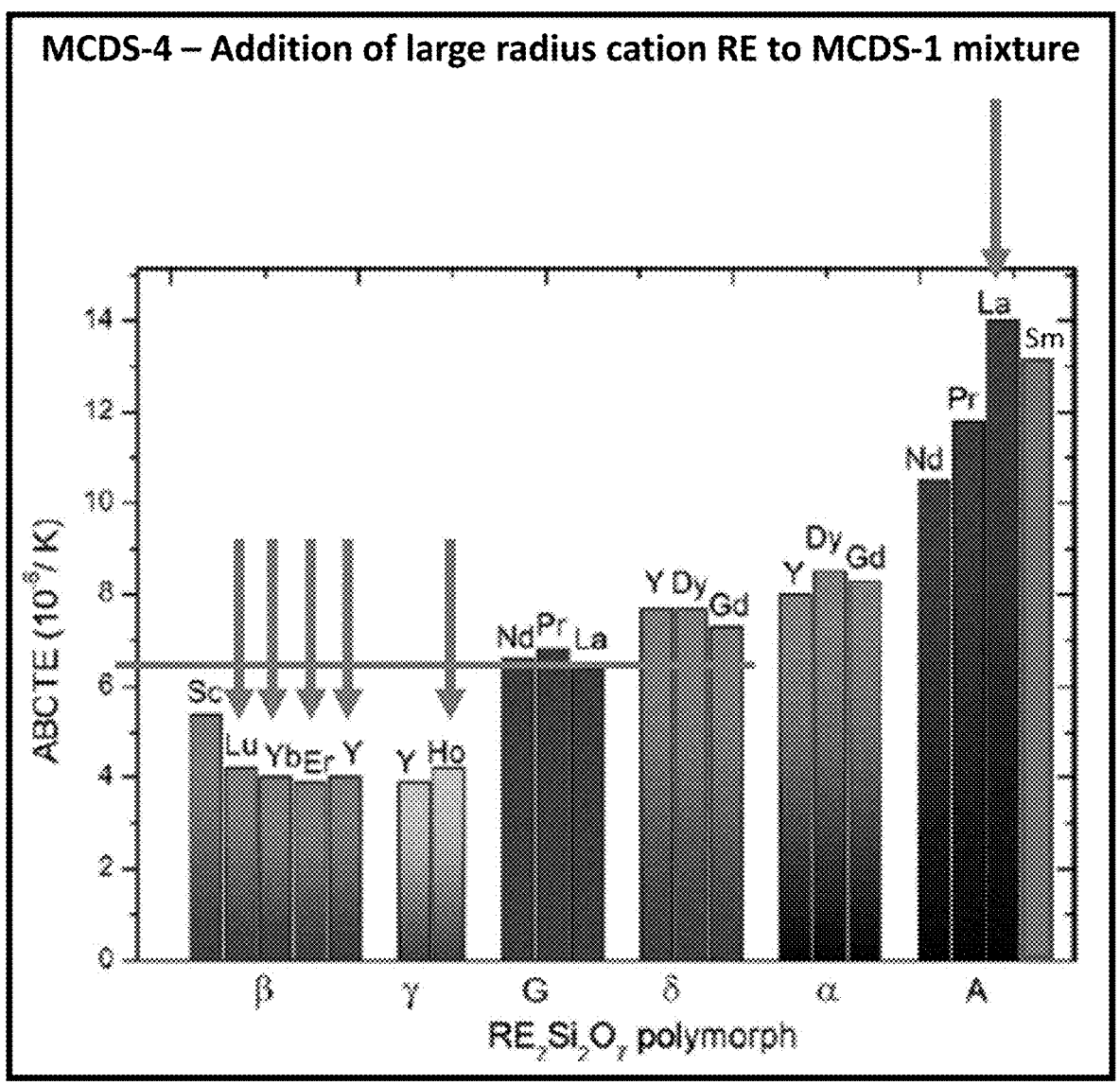
Figure 9D:
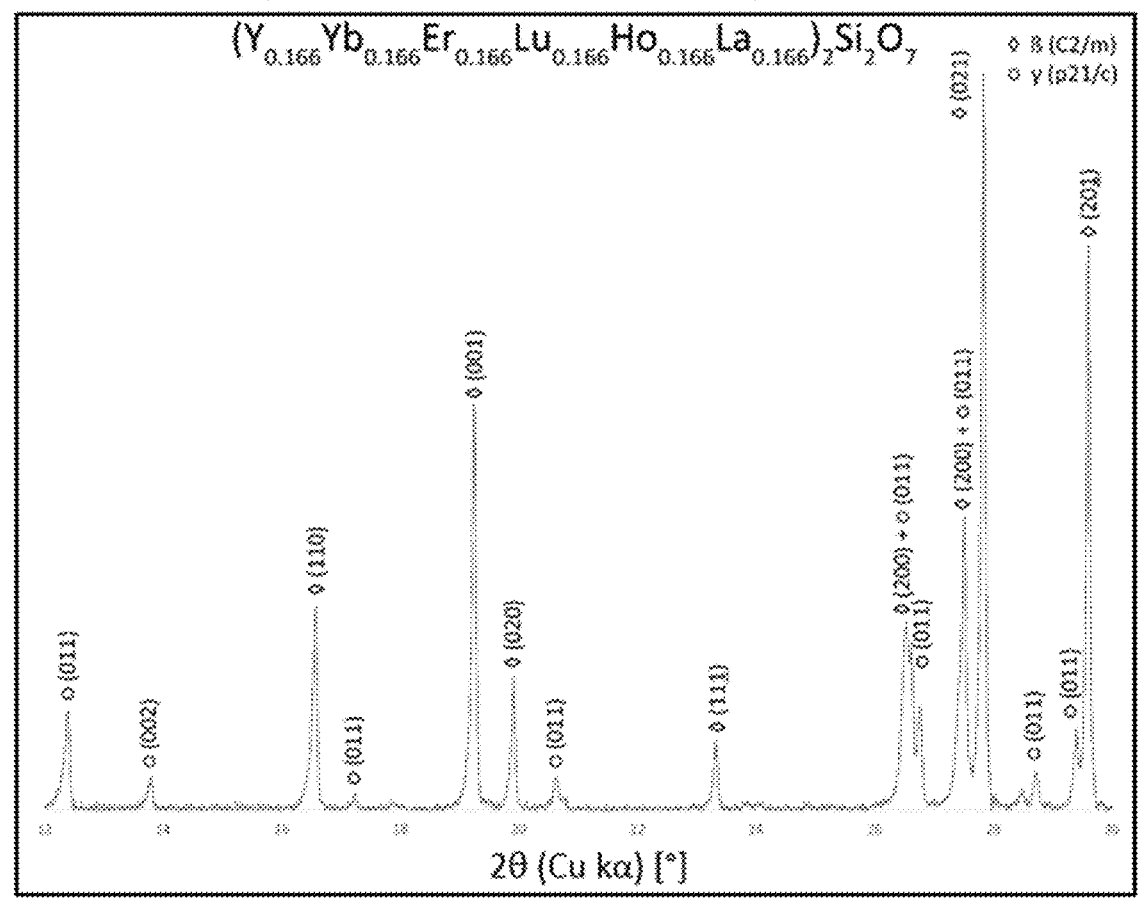
Figures 10A, 10B:
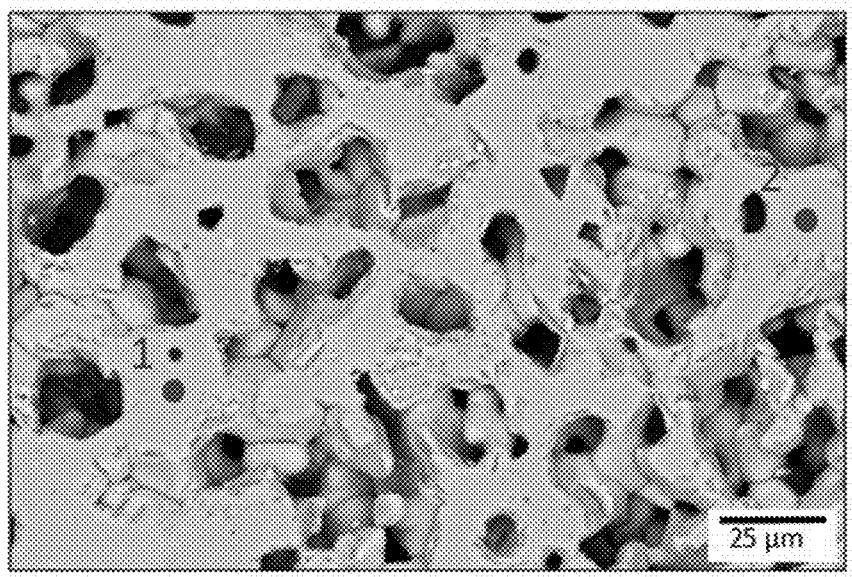
FIG. 10(A)-(D) are screenshots of the experimental results for a multi-component disilicate (MCDS), sample no. 5, examining the addition of a medium radius rare-earth cation to the MCDS-1 mixture, using six (6) rare-earth disilicates (RE-DS) in an equi-molar ratio.
Figure 10C:
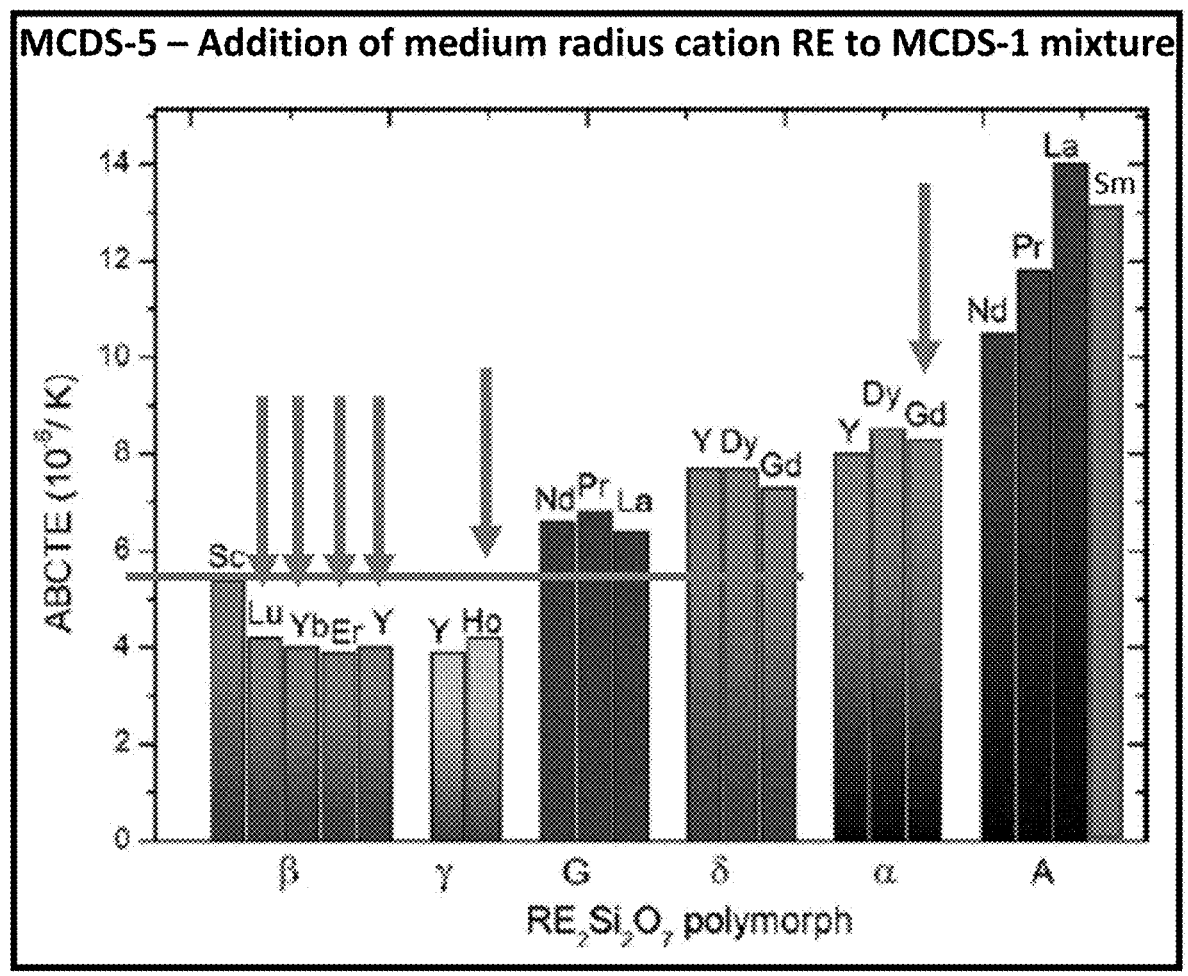
Figure 10D:
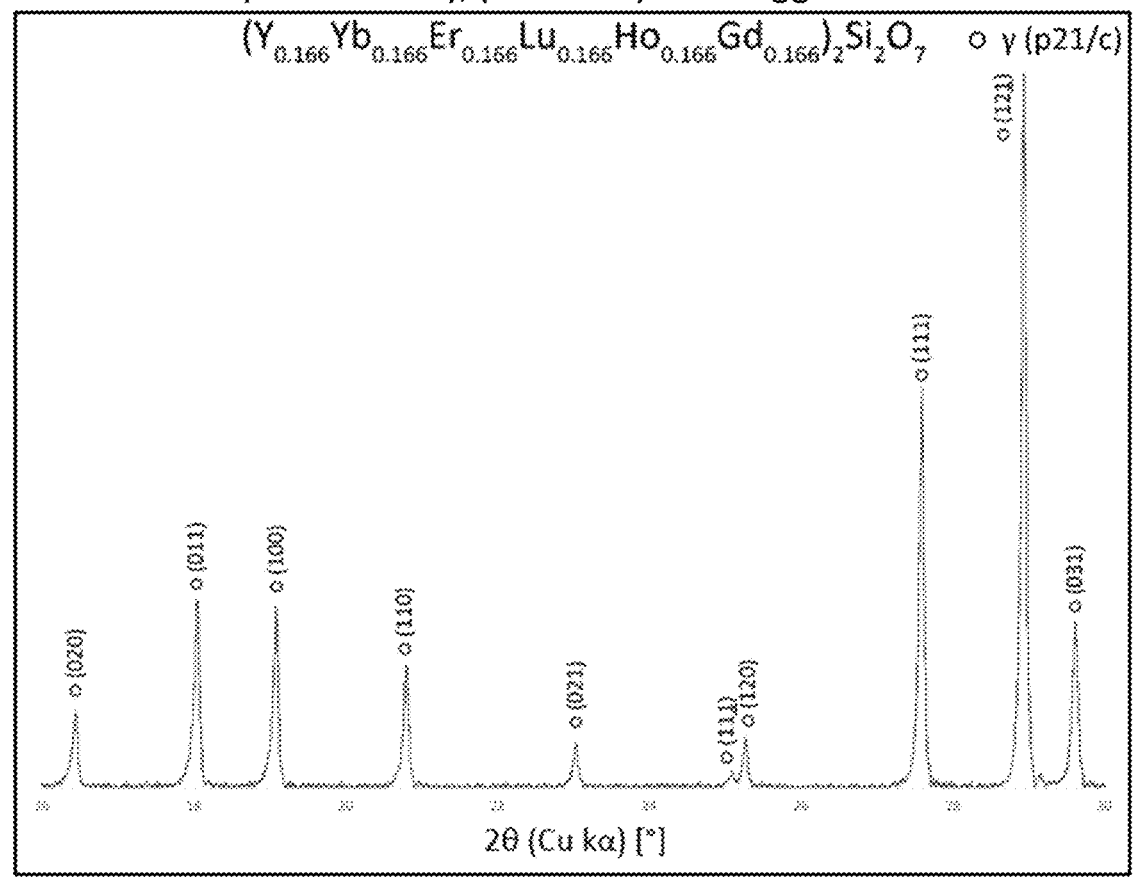

FIG. 5 schematically illustrates a partial cross-sectional view of an embodiment of a barrier coating 1 similar to FIG. 4 and further comprises and intermediate coating or layer 50.

Aspects of various embodiment of the barrier coating 1 which is disclosed herein may include a variety of layers and components. As used herein, references to the term "bonded" are to be understood to include direct and indirect bonding through another layer, such as a bondcoat 20 or an intermediate layer. In an embodiment, for example, the functional barrier 30 may be further characterized by a coefficient of thermal expansion that matches a coefficient of thermal expansion of the bond coat 20. In an embodiment, for example, the functional barrier 30 may be further characterized by a coefficient of thermal expansion that matches a coefficient of thermal expansion of the silicon-based composite. As used herein, references to the term "matched" or "matches," in reference to a coefficient of thermal expansion, are to be understood to refer to a first layer, such as functional barrier 30, having a coefficient of thermal expansion within about +/−15% of a coefficient of thermal expansion of a second layer, such as bond coat 20.

Aspects of various embodiment of the barrier coating 1 which is disclosed herein may include a variety of deposition techniques of applying the various layers to other layers or components. For example, some deposition techniques for fabricating the barrier coating 1 and associated layers and components include, but not limited thereto, the following: electron beam physical vapor deposition (EB-PVD), electron beam directed vapor deposition (EB-DVD), electron beam co-axial plasma deposition (EB-CPD), electron beam spotless arc deposition (EB-SAD), atmospheric plasma spray (APS), high-velocity oxygen fuel spraying (HVOF), vacuum plasma spray (VPS), low-pressure plasma spray (LPPS), suspension plasma spray (SPS), physical vapor deposition (PVD), or plasma spray physical vapor deposition (PS-PVD). The deposition techniques disclosed in any of the cited references 1-33 that are hereby incorporated by reference herein in their entirety and may be employed within the context of the various embodiments provided herein.

Multi-Component Rare Earth Multi-Silicate Material

An aspect of an embodiment provides a multi-component rare earth multi-silicate. A non-limiting example of the multi-component rare earth multi-silicate is an entropy stabilized rare earth multi-silicate. A multi-component rare earth multi-silicate may comprise a composition represented by the following formula:

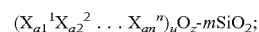

wherein:

$a_1$, $a_2$, through $a_n$ can be equal to any number between 0 and 1, wherein the sum of $a_1+a_2+ \ldots +a_n$ is equal to 1;

n is at least 2;

u is 1 or 2;

z is 2 or 3;

m is greater than 1; and $X^1$, $X^2$, through $X^n$ are selected from Sc, Y, La, Ce, Pr, Nd, Pm, Sm, Eu, Gd, Tb, Dy, Ho, Er, Tm, Yb, Lu, Hf, Zr, and Ti; and wherein the multi-component rare earth multi-silicate is characterized by at least one thermophysical or thermochemical property.

A non-limiting example of the multi-component rare earth multi-silicate may comprise a formula: $(Y_{0.2}La_{0.2}Sm_{0.2}Er_{0.2}Yb_{0.2})_2O_3\text{-}2SiO_2$, $(Y_{0.2}Lu_{0.2}Ho_{0.2}Er_{0.2}Yb_{0.2})_2O_3\text{-}2SiO_2$, Or $(Y_{0.2}La_{0.2}Lu_{0.2}Er_{0.2}Yb_{0.2})_2O_3\text{-}2SiO_2$.

For an embodiment of the multi-component rare earth multi-silicate the at least one thermophysical or thermochemical property may comprise, but not limited thereto: thermal conductivity, coefficient of thermal expansion, refractive index, density, chemical diffusivity, elastic modulus, or optical absorption.

For an embodiment of the multi-component rare earth multi-silicate the at least one thermophysical or thermochemical property can be adjusted as specified (or tuned) by changing the combination of elements in the multi-component rare earth multi-silicate.

For an embodiment of the multi-component rare earth multi-silicate the at least one thermophysical or thermochemical property to be adjusted may be, but not limited thereto, thermal conductivity.

For an embodiment of the multi-component rare earth multi-silicate the at least one thermophysical or thermochemical property to be adjusted may be, but not limited thereto, coefficient of thermal expansion.

For an embodiment of the multi-component rare earth multi-silicate the at least one thermophysical or thermochemical property to be adjusted may be, but not limited thereto, refractive index.

For an embodiment of the multi-component rare earth multi-silicate the at least one thermophysical or thermochemical property to be adjusted may be, but not limited thereto, optical absorption.

For an embodiment of the multi-component rare earth multi-silicate the multi-component rare earth multi-silicate may be, but not limited thereto, characterized by a coefficient of thermal expansion from about $3.5\times10^{-6\circ}$ $C.^{-1}$ to about $15\times10^{-6\circ}$ $C.^{-1}$.

The present inventor notes that regarding aspects of various embodiments that the thermal expansion to design may be dependent on the exact combination of substrate material used and may be closely dependent on the exact application it is intended for.

There may not be a single value to design for, and thus embodiments shall not be constrained to specific substrate/coating materials to a specific thermal expansion range. In an embodiment, a range of thermal expansion coefficients for the substrate material 10 (such as shown, for example but not limited thereto in FIGS. 1-5) to be implemented so as to tailor the material that may include, but not limited thereto, silicon carbide substrate material 10 from about $4.0\times10^{-6\circ}$ $C.^{-1}$ to about $5.5\times10^{-6\circ}$ $C.^{-1}$. In an embodiment, a range of thermal expansion coefficients for the substrate material 10 to be implemented so as to tailor the material that may include, but not limited thereto, nickel and/or cobalt based superalloy substrate material from about $9.0\times10^{-6}$ to about $15.0\times10^{-6\circ}$ $C.^{-1}$. In an embodiment, a range of thermal expansion coefficients for the substrate material 10 to be implemented so as to tailor the material that may include, but not limited thereto, MCrAlY substrate material from about $9.0\times10^{-6\circ}$ $C.^{-1}$ to about $15.0\times10^{-6\circ}$ $C.^{-1}$. In an embodiment, a range of thermal expansion coefficients for the substrate material 10 to be implemented so as to tailor the material that may include, but not limited thereto, MAX Phase (e.g. Ti2AlC or the like) substrate material from about $8.0\times10^{-6\circ}$ $C.^{-1}$ to about $11.0\times10^{-6\circ}$ $C.^{-1}$. In an embodiment, a range of thermal expansion coefficients for the substrate material 10 to be implemented so as to tailor the material that may include, but not limited thereto, refractory alloys substrate material from about $4.0\times10^{-6\circ}$ $C.^{-1}$ to about $10.0\times10^{-6\circ}$ $C.^{-1}$.

For an embodiment of the multi-component rare earth multi-silicate the multi-component rare earth multi-silicate may be, but not limited thereto, characterized by a thermal conductivity of less than 5 W/(m*K) at or above 200° C.

For an embodiment of the multi-component rare earth multi-silicate the multi-component rare earth multi-silicate may be, but not limited thereto, characterized by a melting point of about 1600° C. or greater.

For an embodiment of the multi-component rare earth multi-silicate the at least one thermophysical or thermochemical property is adjusted for application of the multi-component rare earth multi-silicate in a barrier coating 1. For an embodiment of the multi-component rare earth multi-silicate the barrier coating 1 may be, but not limited thereto, a thermal barrier coating (TBC). For an embodiment of the multi-component rare earth multi-silicate the barrier coating 1 may be, but not limited thereto, an environmental barrier coating (EBC).

For an embodiment of the multi-component rare earth multi-silicate the at least one thermophysical or thermochemical property may be adjusted for application of the multi-component rare earth multi-silicate that is, but not limited thereto, a component in a hypersonic leading edge.

For an embodiment of the multi-component rare earth multi-silicate of claim the at least one thermophysical or thermochemical property may be adjusted for application of the multi-component rare earth multi-silicate that, but not limited thereto, a component in a fuel cell.

For an embodiment of the multi-component rare earth multi-silicate the at least one thermophysical or thermochemical property may be adjusted for application of the multi-component rare earth multi-silicate that may be, but not limited thereto, a component in an impact protective barrier layer.

For an embodiment of the multi-component rare earth multi-silicate the at least one thermophysical or thermochemical property may be adjusted for application of the multi-component rare earth multi-silicate that may be, but not limited thereto, a component in a shock protective layer.

For an embodiment of the multi-component rare earth multi-silicate the at least one thermophysical or thermochemical property may be adjusted for application of the multi-component rare earth multi-silicate that may be, but not limited thereto, a component in an optical layer.

For an embodiment of the multi-component rare earth multi-silicate the multi-component rare-earth multi-silicate transforms from a single-phase compound to a multi-phase compound when the temperature goes below temperature of use. For example, if a material is used in the range of 1000-1300° C., or solely at 1300° C., then if the temperature is lowered to, for example, room temperature, it drops "below temperature of use". Other applications and environments for temperature of use are considered part of the various embodiments of the present invention, and may be employed within the context of the various embodiments of the present invention disclosed herein.

For an embodiment of the multi-component rare earth multi-silicate the multi-component rare-earth multi-silicate is a single-phase compound that may be above and below temperature of use.

For an embodiment of the multi-component rare earth multi-silicate the multi-component rare earth multi-silicate is for application in a barrier coating, wherein the barrier coating comprises at least one of, but not limited thereto, the following: a thermal barrier coating (TBC); an environmental barrier coating (EBC); an impact protective barrier layer; or thermal shock protective layer.

General Barrier Coating with Multi-Component Rare Earth Multi-Silicate

Referring to FIGS. 1-5, for example, an aspect of an embodiment provides a barrier coating 1 for application to a substrate material 10. For an embodiment of the barrier coating 1 the barrier coating 1 may comprise: a) a bond coat 20 and a functional barrier 30 or b) a functional barrier 30. For an embodiment, the functional barrier 30 may comprise a multi-component rare earth multi-silicate. A non-limiting example of the multi-component rare earth multi-silicate is an entropy stabilized, or high entropy, rare earth multi-silicate. The multi-component rare earth multi-silicate may comprise a composition represented by the following formula:

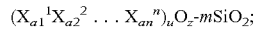

wherein:
$a_1$, $a_2$, through $a_n$ can be equal to any number between 0 and 1, wherein the sum of $a_1+a_2+\ldots+a_n$ is equal to 1;
n is at least 2;
u is 1 or 2;
z is 2 or 3;
m is greater than 1; and
$X^1$, $X^2$, through $X^n$ are selected from Sc, Y, La, Ce, Pr, Nd, Pm, Sm, Eu, Gd, Tb, Dy, Ho, Er, Tm, Yb, Lu, Hf, Zr, and Ti; and
wherein the multi-component rare earth multi-silicate is characterized by at least one thermophysical or thermochemical property.

For an embodiment of the barrier coating 1 the substrate material 10 and/or bond coat 20 comprises a silicon based material comprising, but not limited thereto, the following: silicon, SiAlON, $Si_3N_4$, or SiC.

For an embodiment of the barrier coating 1 the substrate material 10 and/or bond coat 20 may comprise, but not limited thereto, a MAX-phase material.

For an embodiment of the barrier coating 1 the substrate material 10 comprises a MCrAlY, where M is Ni or Co, or a high-entropy alloy material.

For an embodiment of the barrier coating 1 the substrate material 10 and/or bond coat 20 may comprise a refractory metal such as, but not limited thereto, Nb, Ta, Mo, W, Re, or a high-entropy refractory alloy material.

For an embodiment of the barrier coating 1 the substrate material 10 may comprise, but not limited thereto, a nickel and/or cobalt-based superalloy.

For an embodiment of the barrier coating 1 the barrier coating 1 may further comprise, but not limited thereto, an intermediate coat or layer 50.

For an embodiment of the barrier coating 1 the intermediate coat or layer 50 may comprise $ZrO_2$, $HfO_2$, or combinations thereof.

For an embodiment of the barrier coating 1 the barrier coating 1 may further comprise, but not limited thereto, a top layer or coat 40.

For an embodiment of the barrier coating 1 the top layer 40 may comprise, but not limited thereto, the following $ZrO_2$, $HfO_2$, a rare earth monosilicate, or combinations thereof.

For an embodiment of the barrier coating 1 the functional barrier 30 may comprise, but not limited thereto, a multi-component multi-silicate rare earth comprising a formula:

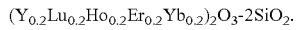

For an embodiment of the barrier coating 1 the multi-component rare earth multi-silicate may be a single-phase compound above and below temperature of use.

For an embodiment of the barrier coating 1 the multi-component rare earth multi-silicate transforms from a single-phase compound to a multi-phase compound when the temperature goes below temperature of use.

For an embodiment of the barrier coating 1 the functional barrier 30 may be further characterized by a coefficient of thermal expansion that matches a coefficient of thermal expansion of the bond coat 20.

For an embodiment of the barrier coating 1 the functional barrier 30 may be characterized by a coefficient of thermal expansion is from about $3.5\times10^{-6}$ $C.^{-1}$ to about $15\times10^{-6}$ $C.^{-1}$.

For an embodiment of the barrier coating 1 the barrier coating 1 may be, but not limited thereto, a thermal barrier coating (TBC).

For an embodiment of the barrier coating 1 the barrier coating 1 may be, but not limited thereto, an environmental barrier coating (EBC).

For an embodiment of the barrier coating 1 the barrier coating 1 may be, but not limited thereto, an impact protective barrier layer or thermal shock protective layer.

For an embodiment of the barrier coating 1 the at least one thermophysical or thermochemical property may comprise, but not limited thereto, the following: thermal conductivity, coefficient of thermal expansion, refractive index, density, chemical diffusivity, elastic modulus, or optical absorption.

For an embodiment of the barrier coating 1 the at least one thermophysical or thermochemical property can be adjusted as specified (or tuned) by changing the combination of elements in the multi-component rare earth multi-silicate.

For an embodiment of the barrier coating 1 the at least one thermophysical or thermochemical property to be adjusted is coefficient of thermal expansion.

For an embodiment of the barrier coating 1 the at least one thermophysical or thermochemical property to be adjusted is thermal conductivity.

For an embodiment of the barrier coating 1 the functional barrier 30 may be further characterized by a thermal conductivity of less than 5 W/(m*K) at 200° C.

For an embodiment of the barrier coating 1 the functional barrier 30 may be further characterized by melting point of about 1600° C. or greater.

For an embodiment of the barrier coating 1 the barrier coating 1 may be configured to be applied to a silicon-carbide based ceramic compound.

For an embodiment of the barrier coating 1 the barrier coating 1 may be configured to be applied to, but not limited thereto, a component of gas turbine engine.

Method of Applying as a Barrier Coating

Referring to FIGS. 1-5, for example, an aspect of an embodiment provides a method for applying a barrier coating 1 to a substrate material 10. An embodiment of the method may comprise: a) applying a bond coat 20 and a functional barrier 30 or b) applying a functional barrier 30. For an embodiment, the functional barrier 30 may comprise: a multi-component rare earth multi-silicate. A non-limiting example of the multi-component rare earth multi-silicate is an entropy stabilized, or high entropy, rare earth multi-silicate. The multi-component rare earth multi-silicate may comprise a composition represented by the following formula:

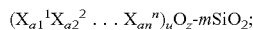

$(X_{a1}^1 X_{a2}^2 \ldots X_{an}^n)_u O_z\text{-}m\text{SiO}_2$;

wherein:

$a_1$, $a_2$, through $a_n$ can be equal to any number between 0 and 1, wherein the sum of $a_1+a_2+\ldots+a_n$ is equal to 1;

n is at least 2;

u is 1 or 2;

z is 2 or 3;

m is greater than 1; and $X^1$, $X^2$, through $X^n$ are selected from Sc, Y, La, Ce, Pr, Nd, Pm, Sm, Eu, Gd, Tb, Dy, Ho, Er, Tm, Yb, Lu, Hf, Zr, and Ti; and wherein the multi-component rare earth multi-silicate is characterized by at least one thermophysical or thermochemical property.

For an embodiment of the method the bond coat 20 is applied first, followed by the functional barrier 30.

An embodiment of the method may further comprise, but not limited thereto, applying an intermediate coat 50.

For an embodiment of the method the bond coat 20 may be applied first, followed by the intermediate coat 50, followed by the functional barrier 30.

An embodiment of the method may further comprise, but not limited thereto, applying a top layer or coat 40.

For an embodiment of the method the top layer or coat 40 may be the final layer applied.

For an embodiment of the method the substrate material 10 and/or bond coat 20 may comprises a silicon-based material such as, but not limited thereto, silicon, SiAlON, $Si_3N_4$, or SiC.

For an embodiment of the method the substrate material 10 and/or bond coat 20 may comprise a MAX-phase material.

For an embodiment of the method the substrate material 10 and/or bond coat 20 may comprise a MCrAlY, where M is, but not limited thereto, Ni or Co, or a high-entropy alloy material.

For an embodiment of the method the substrate material 10 and/or bond coat 20 may comprise a refractory metal such as, but not limited thereto, Nb, Ta, Mo, W, Re, or a high-entropy refractory alloy material.

For an embodiment of the method the intermediate coat or layer 50 may comprise, but not limited thereto, $ZrO_2$, $HfO_2$, or combinations thereof.

For an embodiment of the method the top coat or layer 40 may comprise, but not limited thereto, $ZrO_2$, $HfO_2$, a rare earth monosilicate, or combinations thereof.

For an embodiment of the method the functional barrier 30 may comprise a multi-component rare earth multi-silicate comprising a formula, such as but not limited thereto, the following: $(Y_{0.2}La_{0.2}Sm_{0.2}Er_{0.2}Yb_{0.2})_2O_3\text{-}2SiO_2$, $(Y_{0.2}Lu_{0.2}Ho_{0.2}Er_{0.2}Yb_{0.2})_2O_3\text{-}2SiO_2$, or $(Y_{0.2}La_{0.2}Lu_{0.2}Er_{0.2}Yb_{0.2})_2O_3\text{-}2SiO_2$.

For an embodiment of the method the barrier coating 1 may be applied to a silicon-carbide based ceramic material.

For an embodiment of the method the barrier coating 1 may be applied to, but not limited thereto, a component of a gas turbine engine (or other types of components in other areas, environments, operations, systems, or applications; including any disclosed in any of the cited references 1-33 that are hereby incorporated by reference herein in their entirety and may be employed within the context of the various embodiments provided herein).

For an embodiment of the method the multi-component rare earth multi-silicate may be a single-phase compound above and below temperature of use.

For an embodiment of the method the multi-component rare earth multi-silicate transforms from a single-phase compound to a multi-phase compound when the temperature goes below temperature of use.

For an embodiment of the method the functional barrier 30 may be further characterized by a coefficient of thermal expansion that matches a coefficient of thermal expansion of the silicon-based composite.

For an embodiment of the method the functional barrier 30 may be further characterized by a coefficient of thermal expansion that is from about $3.5 \times 10^{-6}$ $C.^{-1}$ to about $15 \times 10^{-6}$ $C.^{-1}$.

For an embodiment of the method the barrier coating 1 may be a thermal barrier coating (TBC).

For an embodiment of the method the barrier coating 1 may be, but not limited thereto, an impact protective barrier layer or thermal shock protective layer.

For an embodiment of the method the barrier coating 1 may be, but not limited thereto, an environmental barrier coating (EBC).

For an embodiment of the method the at least one thermophysical or thermochemical property may comprise, but not limited thereto, the following: thermal conductivity, coefficient of thermal expansion, refractive index, density, chemical diffusivity, elastic modulus, or optical absorption.

For an embodiment of the method at least one thermophysical or thermochemical property to be adjusted as specified (or tuned) may be, but not limited thereto, the coefficient of thermal expansion.

For an embodiment of the method at least one thermophysical or thermochemical property to be adjusted may be, but not limited thereto, thermal conductivity.

For an embodiment of the method the functional barrier 30 may be further characterized by a thermal conductivity of less than 5 W/(m*K) at or above 200° C.

For an embodiment of the method the functional barrier 30 may be further characterized by melting point of about 1600° C. or greater.

For an embodiment of the method the barrier coating 1 may be applied by, but not limited thereto, the following: electron beam physical vapor deposition (EB-PVD), electron beam directed vapor deposition (EB-DVD), electron beam co-axial plasma deposition (EB-CPD), electron beam spotless arc deposition (EB-SAD), atmospheric plasma spray (APS), high-velocity oxygen fuel spraying (HVOF), vacuum plasma spray (VPS), low-pressure plasma spray (LPPS), suspension plasma spray (SPS), physical vapor deposition (PVD), or plasma spray physical vapor deposition (PS-PVD) (as well as a combination of one or more such application techniques).

Silicon-based Ceramic Compound Barrier Coating

Referring to FIGS. 1-5, for example, an aspect of an embodiment provides a silicon based ceramic compound comprising a barrier coating 1. In an embodiment, the barrier coating 1 may comprise: a) a bond coat 20 and a functional barrier 30 or b) a functional barrier 30. For an embodiment, the functional barrier 30 may comprise: a multi-component rare earth multi-silicate. A non-limiting example of the multi-component rare earth multi-silicate is an entropy stabilized, or high entropy, rare earth multi-silicate. The multi-component rare earth multi-silicate may comprise a composition represented by the following formula:

$$(X_{a1}^1 X_{a2}^2 \ldots X_{an}^n)_u O_z\text{-}m SiO_2;$$

wherein:
  $a_1$, $a_2$, through $a_n$ can be equal to any number between 0 and 1, wherein the sum of $a_1+a_2+\ldots+a_n$ is equal to 1;
  n is at least 2;
  u is 1 or 2;
  z is 2 or 3;
  m is greater than 1; and
  $X^1$, $X^2$, through $X^n$ are selected from Sc, Y, La, Ce, Pr, Nd, Pm, Sm, Eu, Gd, Tb, Dy, Ho, Er, Tm, Yb, Lu, Hf, Zr, and Ti; and
wherein the multi-component rare earth multi-silicate is characterized by at least one thermophysical or thermochemical property.

For an embodiment of the silicon based ceramic compound the bond coat 20 may comprise a silicon-based material comprising, but not limited thereto, the following: silicon, SiAlON, $Si_3N_4$, or SiC.

For an embodiment of the silicon based ceramic compound the bond coat 20 may comprise a MAX-phase material.

For an embodiment of the silicon based ceramic compound the bond coat 20 may comprise a MCrAlY, where M is, but not limited thereto, Ni or Co, or a high-entropy alloy material.

For an embodiment of the silicon based ceramic compound the bond coat 20 may comprise a refractory metal such as, but not limited thereto, Nb, Ta, Mo, W, Re, or a high-entropy refractory alloy material.

For an embodiment of the silicon based ceramic compound the barrier coating 1 may further comprise, but not limited thereto, an intermediate coat or layer 50.

For an embodiment of the silicon based ceramic compound the intermediate coat or layer 50 may comprise, but not limited thereto, $ZrO_2$, $HfO_2$, or combinations thereof.

For an embodiment of the silicon based ceramic compound the barrier coating 1 may further comprise, but not limited thereto, a top layer or coat 40.

For an embodiment of the silicon based ceramic compound the top layer or coat 40 may comprise, but not limited thereto, $ZrO_2$, $HfO_2$, a rare earth monosilicate, or combinations thereof.

For an embodiment of the silicon based ceramic compound the functional barrier 30 may comprise a multi-component rare earth multi-silicate comprising a formula including, but not limited thereto, the following: $(Y_{0.2}La_{0.2}Sm_{0.2}Er_{0.2}Yb_{0.2})_2O_3$-$2SiO_2$, $(Y_{0.2}Lu_{0.2}Ho_{0.2}Er_{0.2}Yb_{0.2})_2O_3$-$2SiO_2$, or $(Y_{0.2}La_{0.2}Lu_{0.2}Er_{0.2}Yb_{0.2})_2O_3$-$2SiO_2$.

For an embodiment of the silicon based ceramic compound the silicon based ceramic compound may be, but not limited thereto, a component of a gas turbine engine (or other types of components in other areas, environments, operations, systems, or applications; including any disclosed in any of the cited references 1-33 that are hereby incorporated by reference herein in their entirety and may be employed within the context of the various embodiments provided herein).

For an embodiment of the silicon based ceramic compound the multi-component rare earth multi-silicate may be a single-phase compound above and below temperature of use.

For an embodiment of the silicon based ceramic compound the multi-component rare earth multi-silicate transforms from a single-phase compound to a multi-phase compound when the temperature goes below temperature of use.

For an embodiment of the silicon based ceramic compound the functional barrier 30 may be further characterized by a coefficient of thermal expansion that matches a coefficient of thermal expansion of the silicon based composite.

For an embodiment of the silicon based ceramic compound the functional barrier 30 may be further characterized by a coefficient of thermal expansion is from about $3.5 \times 10^{-6}$° $C.^{-1}$ to about $15 \times 10^{-6}$° $C.^{-1}$.

For an embodiment of the silicon based ceramic compound the barrier coating 1 may be, but not limited thereto, a thermal barrier coating (TBC).

For an embodiment of the silicon based ceramic compound the barrier coating 1 may be, but not limited thereto, an environmental barrier coating (EBC).

For an embodiment of the silicon based ceramic compound the barrier coating 1 may be, but not limited thereto, an impact protective barrier layer or thermal shock protective layer.

For an embodiment of the silicon based ceramic compound the at least one thermophysical or thermochemical property may comprise, but not limited thereto, thermal conductivity, coefficient of thermal expansion, refractive index, density, chemical diffusivity, elastic modulus, or optical absorption.

For an embodiment of the silicon based ceramic compound the at least one thermophysical or thermochemical property to be adjusted as specified (or tuned) may be coefficient of thermal expansion.

For an embodiment of the silicon based ceramic compound the at least one thermophysical or thermochemical property to be adjusted as specified (or tuned) may be thermal conductivity.

For an embodiment of the silicon based ceramic compound the functional barrier 30 may be further characterized by a thermal conductivity of less than 5 W/(m*K) at or above 200° C.

For an embodiment of the silicon based ceramic compound the functional barrier 30 may be further characterized by melting point of about 1600° C. or greater.

For an embodiment of the silicon based ceramic compound the barrier coating 1 may be deposited by, but not limited thereto, the following: electron beam physical vapor deposition (EB-PVD), electron beam directed vapor deposition (EB-DVD), electron beam co-axial plasma deposition (EB-CPD), electron beam spotless arc deposition (EB-SAD), atmospheric plasma spray (APS), high-velocity oxygen fuel spraying (HVOF), vacuum plasma spray (VPS), low-pressure plasma spray (LPPS), physical vapor deposition (PVD); suspension plasma spray (SPS), or plasma spray physical vapor deposition (PS-PVD) (as well as a combination of one or more such deposition techniques).

EXAMPLES

Practice of an aspect of an embodiment (or embodiments) of the invention will be still more fully understood from the following examples and experimental results, which are presented herein for illustration only and should not be construed as limiting the invention in any way.

Example and Experimental Results No. 1

FIG. 6(A)-(D) are screenshots of the experimental results for a multi-component disilicate (MCDS), sample no. 1, examining the effect of mixing small radius rare-earth cation disilicates on thermal conductivity reduction while retaining a coefficient of thermal expansion (CTE) of about $4 \times 10^{-6}$ $C.^{-1}$, using five (5) rare-earth disilicates (RE-DS) in an equi-molar ratio. Accordingly, it is demonstrated that the properties (for example, thermal conductivity, etc.) can be tailored to fit specific applications. In a non-limiting approach, the experiment included: cold-pressed oxides at 40 MPa, anneal at 1500° C. for 72 hours; 91.6% density; thermal conductivity measured using hot disc method=$2.2 \pm 0.54$ W/m K; and CTE measured by dilatometry=$4.35 \times 10^{-6}$/° C.

Example and Experimental Results No. 2

FIG. 7(A)-(D) are screenshots of the experimental results for a multi-component disilicate (MCDS), sample no. 2, examining the effect of mixing multi-phase rare earth disilicates (RE-DS) on coefficient of thermal expansion (CTE) and thermal conductivity, using five (5) rare-earth disilicates (RE-DS) in an equi-molar ratio. Accordingly, it is demonstrated that the properties (for example, thermal expansion, thermal conductivity, etc.) can be tailored to fit specific applications. In a non-limiting approach, the experiment included: cold-pressed oxides at 40 MPa, annealed at 1500° C. for 72 hours; 86.4% density; thermal conductivity=$1.13 \pm 0.15$ W/m K; and CTE=$7.05 \times 10^{-6}$/° C.

Example and Experimental Results No. 3

FIG. 8(A)-(D) are screenshots of the experimental results for a multi-component disilicate (MCDS), sample no. 3, further examining the effect of mixing various multi-phase rare earth disilicates (RE-DS) on coefficient of thermal expansion (CTE) and thermal conductivity, using five (5) rare-earth disilicates (RE-DS) in an equi-molar ratio. Accordingly, it is demonstrated that the properties (for example, thermal expansion, thermal conductivity, etc.) can be tailored to fit specific applications. In a non-limiting approach, the experiment included: cold-pressed oxides at 40 MPa, annealed at 1500° C. for 72 hours; 92.7% density; thermal conductivity=$1.57 \pm 0.44$ W/m K; and CTE=$6.58 \times 10^{-6}$ $C.^{-1}$.

Example and Experimental Results No. 4

FIG. 9(A)-(D) are screenshots of the experimental results for a multi-component disilicate (MCDS), sample no. 4, examining the addition of a large radius rare-earth cation to the MCDS-1 mixture, using six (6) rare-earth disilicates (RE-DS) in an equi-molar ratio. Accordingly, it is demonstrated that the properties (for example, thermal expansion, thermal conductivity, etc.) can be tailored to fit specific applications. In a non-limiting approach, the experiment included: cold-pressed oxides at 40 MPa, annealed at 1500° C. for 72 hours; 97.3% density; thermal conductivity=1.80 W/m K; and CTE=$6.54 \times 10^{-6}$ $C.^{-1}$.

Example and Experimental Results No. 5

FIG. 10(A)-(D) are screenshots of the experimental results for a multi-component disilicate (MCDS), sample no. 5, examining the addition of a medium radius rare-earth cation to the MCDS-1 mixture, using six (6) rare-earth disilicates (RE-DS) in an equi-molar ratio. Accordingly, it is demonstrated that the properties (for example, thermal expansion, thermal conductivity, etc.) can be tailored to fit specific applications. In a non-limiting approach, the experiment included: cold-pressed oxides at 40 MPa, annealed at 1500° C. for 72 hours; 52.3% density; thermal conductivity=1.78 W/m K; and CTE=$5.64 \times 10^{-6}$ $C.^{-1}$.

REFERENCES

The devices, systems, articles, components, apparatuses, compositions, materials, machine readable medium, computer program products, and methods of various embodiments of the invention disclosed herein may utilize aspects (e.g., devices, systems, articles, components, apparatuses, compositions, materials, machine readable medium, computer program products, and methods) disclosed in the following references, applications, publications and patents and which are hereby incorporated by reference herein in their entirety, and which are not admitted to be prior art with respect to the present invention by inclusion in this section:

1. U.S. Patent Application Publication No. US 2017/0236692 A1, Wadley, et al., "Coaxial Hollow Cathode Plasma Assisted Directed Vapor Deposition and Related Method Thereof", Aug. 17, 2017.
2. U.S. Pat. No. 9,640,369 B2, Wadley, et al., "Coaxial Hollow Cathode Plasma Assisted Directed Vapor Deposition and Related Method Thereof", May 2, 2017.
3. International Patent Appl. Publ. No. WO 2010/099218 A1, Wadley, et al., "Coaxial Hollow Cathode Plasma Assisted Directed Vapor Deposition and Related Method Thereof", Sep. 2, 2010.
4. U.S. Patent Application Publication No. US 2014/0272197 A1, Lee, "Directed Vapor Deposition of Environmental Barrier Coatings", Sep. 18, 2014.
5. U.S. Pat. No. 10,125,618 B2, Lee, "Vapor Deposition of Rare Earth Silicate Environmental Barrier Coatings", Nov. 13, 2018.
6. U.S. Patent Application Publication No. US 2014/0261080 A1, Lee, "Rare Earth Silicate Environmental Barrier Coatings", Sep. 18, 2014.
7. International Patent App. Publ. No. WO 2012/027442 A1, Lee, "Rare Earth Silicate Environmental Barrier Coatings", Mar. 1, 2012.
8. U.S. Pat. No. 9,944,563 B2, Kirby, et al., "Silicon-Based Materials Containing Indium and Methods of Forming the Same", Apr. 17, 2018.
9. U.S. Pat. No. 10,138,740 B2, Kirby, et al., "Silicon-Based Materials Containing Gallium and Methods of Forming the Same", Nov. 27, 2018.
10. U.S. Pat. No. 10,214,457 B2, Kirby, et al., "Compositions Containing Gallium and/or Indium and Methods of Forming the Same", Feb. 26, 2019.
11. U.S. Patent Application Publication No. US 2018/0201544 A1, Kirby, et al., "Silicon-Based Materials Containing Indium and Methods of Forming the Same", Jul. 19, 2018. (is now U.S. Pat. No. 10,214,457, above)
12. International Patent Appl. Publ. No. WO 2018/052739 A1, Kirby, et al., "Compositions Containing Gallium and/or Indium and Methods of Forming the Same", Mar. 22, 2018.
13. U.S. Patent Application Publication No. US 2007/0111013 A1, Bhatia, et al., "Silicon Based Substrate with Hafnium Containing Barrier Layer", May 17, 2007.

14. U.S. Patent Application Publication No. US 2007/0065672 A1, Bhatia, et al., "Silicon Based Substrate with Hafnium Containing Barrier Layer", Mar. 22, 2007.
15. U.S. Pat. No. 5,985,470, Spitsberg, et al., "Thermal/Environmental Barrier Coating System for Silicon-Based Materials", Nov. 16, 1999.
16. U.S. Pat. No. 6,607,852 B2, Spitsberg, et al., "Environmental/Thermal Barrier Coating System with Silica Diffusion Barrier Layer", Aug. 19, 2003.
17. U.S. Pat. No. 7,595,114 B2, Meschter, et al., "Environmental Barrier Coating for a Component and Method for Fabricating the Same", Sep. 29, 2009. (parent of U.S. Pat. No. 7,910,172 below)
18. U.S. Pat. No. 7,910,172 B2, Meschter, et al., "Method for Fabricating a Component Having an Environmental Barrier Coating", Mar. 22, 2011.
19. U.S. Pat. No. 7,740,960 B1, Zhu, et al., "Multifunctionally Graded Environmental Barrier Coatings for Silicon-Base Ceramic Components", Jun. 22, 2010.
20. U.S. Patent Application Publication No. US 2013/0344319 A1, Zhu, et al., "Advanced High Temperature and Fatigue Resistant Environmental Barrier Coating Bond Coat Systems for SiC/SiC Ceramic Matrix Composites", Dec. 26, 2013.
21. Rost C M, Sachet E, Borman T, Moballegh A, Dickey E C, Hou D, Jones J L, Curtarolo S, Maria J P, "Entropy-Stabilized Oxides", Nature Communications 2015; 6:8485. doi:10.1038/ncomms9485.
22. Dong Y, Ren K, Lu Y, Wang Q, Liu J, Wang Y, "High-Entropy Environmental Barrier Coating for the Ceramic Matrix Composites", J of the European Ceramic Society. 2019; 39:2754-2579. doi:10.1016/j.jeurceramsoc.2019.02.022.
23. European Patent No. 3243809B, Matsumoto, et al., "Coated Member and Method for Producing Coated Member", Apr. 10, 2019.
24. European Patent No. 3243925B1, Matsumoto, et al., "Coating Material, Coated Member and Method for Producing Coated Member", May 15, 2019.
25. Chinese Patent No. 106342076B, Gao, et al., "Composite Rare Earth Silicate Powder Method for Preparing", Jul. 10, 2013.
26. Korean Patent No. 101884442B1, Park, et al., "High Entropy Alloy Overcoming Strength-Ductility Trade-Off", Aug. 1, 2018.
27. Chinese Patent No. 109402482A, Xue, et al., "Lightweight High-Entropy Alloy with high Strength and High Plasticity and Preparation Method Thereof", Mar. 1, 2019.
28. European Patent No. 0493903B1, Berkstresser, et al., "Method of Growing Rare Earth Doped Orthosilicates (Ln2-xRExSio5)", Dec. 7, 1994.
29. Heng C, Xiang H, Dai F, Liu J, Zhou Y, "High Entropy (Yb0.25Y0.25Lu0.25Er0.25)2SiO5 with Strong Anistrophy in Thermal Expansion", J of Materials Science and Technology. Preprint. Jul. 24, 2019. https://doi.org/10.1016/j.jmst.2019.07.022.
30. Dong Y, Ren K, Lu Y, Wang Q, Liu J, Wang Y, "High-Entropy Environmental Barrier Coating for the Ceramic Matrix Composites", J of the European Ceramic Society. 2019; 39:2574-2579. haps://doi.org/10.1016/j.jeurceramsoc.2019.02.022.
31. Ren X, Tian Z, Zhang J, Wang J, "Equiatomic Quarternary (Y1/4Ho1/4Er1/4Yb1/4)2SiO5 Silicate: A Perspective Multifunctional Thermal and Environmental Barrier Coating Material", Scripta Materialia. 2019; 168:47-50. https://doi.org/10.1016/j.scriptamat.2019.04.018.
32. Tian, Z, Zheng, L, Hu W, Sun L, Zhang J, Wang J, "Tunable Properties of (Hox Y1-x)2SiO5 as Damage Self-Monitoring Environmental/Thermal Barrier Coating Candidates", Scientific Reports. 2019; 9:415. https://doi.org/10.1038/s41598-018-36883-2.
33. Luo X, Sun L, Wang J, Wu Z, Lv X, Wang J, "Material-Genome Perspective Towards Tunable Thermal Expansion of Rare-Earth Di-Silicates", J of the European Ceramic Society. 2018; 38:3547-3554. https://doi.org/10.1016/j.jeurceramsoc.2018.04.021.

Unless clearly specified to the contrary, there is no requirement for any particular described or illustrated activity or element, any particular sequence or such activities, any particular size, speed, material, duration, contour, dimension or frequency, or any particularly interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. It should be appreciated that aspects of the present invention may have a variety of sizes, contours, shapes, compositions and materials as desired or required.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A barrier coating for application to a substrate material, said barrier coating comprising:
   a) a bond coat and a functional barrier, or
   b) a functional barrier; and
   wherein the functional barrier comprises:
      a multi-component rare earth multi-silicate comprising a composition represented by the following formula:
      $(Y_{0.2}Lu_{0.2}Ho_{0.2}Er_{0.2}Yb_{0.2})_2O_3\text{-}2SiO_2$,
      $(Y_{0.2}La_{0.2}Sm_{0.2}Er_{0.2}Yb_{0.2})_2O_3\text{-}2SiO_2$, or
      $(Y_{0.2}La_{0.2}Lu_{0.2}Er_{0.2}Yb_{0.2})_2O_3\text{-}2SiO_2$; and
      wherein the multi-component rare earth multi-silicate is characterized by at least one thermophysical or thermochemical property.

2. The barrier coating of claim 1, wherein the substrate material and/or bond coat comprises a silicon based material comprising: silicon, SiAlON, $Si_3N_4$, or SiC.

3. The barrier coating of claim 1, wherein the substrate material and/or bond coat comprises a MAX-phase material.

4. The barrier coating of claim 1, wherein the substrate material comprises a MCrAlY, where M is Ni or Co, or a high-entropy alloy material.

5. The barrier coating of claim 1, wherein the substrate material and/or bond coat comprises a refractory metal such as Nb, Ta, Mo, W, Re, or a high-entropy refractory alloy material.

6. The barrier coating of claim 1, wherein the substrate material comprises a nickel and/or cobalt-based superalloy.

7. The barrier coating of claim 1, wherein the barrier coating further comprises an intermediate coat.

8. The barrier coating of claim 7, wherein the intermediate coat comprises $ZrO_2$, $HfO_2$, or combinations thereof.

9. The barrier coating of claim 5, wherein the top layer comprises $ZrO_2$, $HfO_2$, a rare earth monosilicate, or combinations thereof.

10. The barrier coating of claim 1, wherein the multi-component rare earth multi-silicate is a single-phase compound above and below temperature of use.

11. The barrier coating of claim 1, wherein the multi-component rare earth multi-silicate transforms from a single-phase compound to a multi-phase compound when the temperature goes below temperature of use.

12. The barrier coating of claim 1, wherein the functional barrier is further characterized by a coefficient of thermal expansion that matches a coefficient of thermal expansion of the bond coat.

13. The barrier coating of claim 1, wherein the functional barrier is characterized by a coefficient of thermal expansion is from about $3.5\times10^{-6}$ $C.^{-1}$ to about $15\times10^{-6}$ $C.^{-1}$.

14. The barrier coating of claim 1, wherein the barrier coating is a thermal barrier coating (TBC).

15. The barrier coating of claim 1, wherein the barrier coating is an environmental barrier coating (EBC).

16. The barrier coating of claim 1, wherein the barrier coating is an impact protective barrier layer or thermal shock protective layer.

17. The barrier coating of claim 1, wherein the at least one thermophysical or thermochemical property comprises: thermal conductivity, coefficient of thermal expansion, refractive index, density, chemical diffusivity, elastic modulus, or optical absorption.

18. The barrier coating of claim 1, wherein the at least one thermophysical or thermochemical property can be adjusted as specified by changing the combination of elements in the multi-component rare earth multi-silicate.

19. The barrier coating of claim 18, wherein the at least one thermophysical or thermochemical property to be adjusted is coefficient of thermal expansion.

20. The barrier coating of claim 18, wherein the at least one thermophysical or thermochemical property to be adjusted is thermal conductivity.

21. The barrier coating of claim 1, wherein the functional barrier is further characterized by a thermal conductivity of less than 5 W/(m*K) at 200° C.

22. The barrier coating of claim 1, wherein the functional barrier is further characterized by melting point of about 1600° C. or greater.

23. The barrier coating of claim 1, wherein the barrier coating is configured to be applied to a silicon-carbide based ceramic compound.

24. The barrier coating of claim 21, wherein the barrier coating is configured to be applied to a component of gas turbine engine.

25. The barrier coating of claim 1, wherein the barrier coating further comprises a top layer.

26. The barrier coating of claim 7, wherein the barrier coating further comprises a top layer.

* * * * *